(12) United States Patent  
Arens et al.

(10) Patent No.: US 12,255,347 B1  
(45) Date of Patent: Mar. 18, 2025

(54) CONFIGURABLE BATTERY PACK

(71) Applicant: Rivian IP Holdings, LLC, Irvine, CA (US)

(72) Inventors: Ryan Arens, Irvine, CA (US); Brandon Thayer, Mission Viejo, CA (US); Casey Taylor Dunn, Mission Viejo, CA (US); Kyle Butterfield, Ladera Ranch, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 0 days.

(21) Appl. No.: 18/527,192

(22) Filed: Dec. 1, 2023

(51) Int. Cl.  
*H01M 50/267* (2021.01)  
*H01M 10/42* (2006.01)  
*H01M 50/209* (2021.01)  
*H01M 50/244* (2021.01)  
*H01M 50/249* (2021.01)

(52) U.S. Cl.  
CPC ....... *H01M 50/267* (2021.01); *H01M 10/425* (2013.01); *H01M 50/209* (2021.01); *H01M 50/244* (2021.01); *H01M 50/249* (2021.01); *H01M 2220/20* (2013.01)

(58) Field of Classification Search  
CPC .................................................. H01M 50/267  
See application file for complete search history.

(56) References Cited

U.S. PATENT DOCUMENTS

| | | | |
|---|---|---|---|
| 11,607,961 B2 | 3/2023 | Sekar et al. | |
| 2020/0148066 A1* | 5/2020 | Sekar | H01M 50/262 |
| 2020/0152937 A1* | 5/2020 | Sekar | H01M 50/271 |
| 2020/0153219 A1* | 5/2020 | Baseri | H01M 50/522 |

\* cited by examiner

*Primary Examiner* — Maria Laios  
*Assistant Examiner* — Jordan E Berresford  
(74) *Attorney, Agent, or Firm* — BAKERHOSTETLER

(57) ABSTRACT

Aspects of the disclosure relate to a configurable battery pack. The configurable battery pack may include an enclosure that is formed from housing structures that can be selectively chosen to form an enclosure of various sizes, for enclosing various numbers of battery modules and/or battery cells.

17 Claims, 15 Drawing Sheets

1300

1302 Identify a number of battery modules to be included in a battery pack

1304 Determine whether the number of battery modules is odd or even

1306 Obtain a casted front section of an enclosure for the battery pack based on the determination of whether the number of battery modules is odd or even

1308 Assemble the enclosure for the battery pack including the front section

FIG. 13

CONFIGURABLE BATTERY PACK

INTRODUCTION

Batteries are often used as a source of power, including as a source of power for electric vehicles that include wheels that are driven by an electric motor that receives power from the battery.

Aspects of the subject technology can help to improve the manufacturability and proliferation of electric vehicles, which can help to mitigate climate change by reducing greenhouse gas emissions.

SUMMARY

Aspects of the subject disclosure relate to a configurable enclosure for a battery pack, such as a battery pack for an electric vehicle. The configurable enclosure allows efficient manufacturing of battery pack enclosures, and efficient assembly of battery packs with any of various numbers of battery modules and/or battery cells within the battery pack enclosure. This can allow the same set of pack housing structures to form battery packs for vehicles of varying size, model, and/or type.

In accordance with aspects of the subject disclosure, an apparatus is provided that includes a casted member for an enclosure for a configurable battery pack, the casted member having: a cavity configured to enclose a high voltage distribution box; a first end connectable to any of a plurality of first extruded sidewalls having a plurality of respective lengths, and a second end connectable to any of a plurality of second extruded sidewalls having the plurality of respective lengths. The casted member may also include an additional cavity configured to receive a battery module for the configurable battery pack.

The casted member may have a shape that is based on a number of battery modules of the configurable battery pack. The casted member may also include one or more openings configured to provide access to one or more electrical components of the configurable battery pack from outside the enclosure. The casted member may also include at least one notch configured to receive a cable coupled to one or more battery modules of the configurable battery pack.

The casted member may be configured to attach to a base plate and a lid of the enclosure. The casted member may include a casted front portion of the enclosure for the configurable battery pack.

In accordance with other aspects of the subject disclosure, a configurable battery pack is provided that includes a casted member for an enclosure for the configurable battery pack, the casted member having: a cavity configured to enclose a high voltage distribution box, a first end connectable to any of a plurality of first extruded sidewalls having a plurality of respective lengths, and a second end connectable to any of a plurality of second extruded sidewalls having the plurality of respective lengths.

The configurable battery may also include one of the plurality of first extruded sidewalls having one of the respective lengths and welded to the first end of the casted member, the one of the respective lengths being based on number of battery cells of the configurable battery pack. The configurable battery may also include one of the plurality of second extruded sidewalls having the one of the respective lengths and welded to the second end of the casted member.

The casted member may include a casted front member, and the configurable battery pack may also include a casted rear member welded to the one of the plurality of first extruded sidewalls and the one of the plurality of second extruded sidewalls. The casted rear member may include an extension having an opening configured to receive one or more electrical components of the configurable battery pack.

The configurable battery pack may be configured to enclose an odd number of battery modules, and the casted member may include an additional cavity configured to receive one of the odd number of battery modules. The one of the respective lengths may be based on the odd number of battery modules.

The configurable battery pack may be configured to enclose an even number of battery modules, and the casted member may have a size that is smaller than a size of each of the even number of battery modules. The one of the respective lengths may be based on the even number of battery modules.

The high voltage distribution box may be disposed in the cavity.

In accordance with other aspects of the subject disclosure, a method is provided that includes identifying a number of battery modules to be included in a battery pack; determining whether the number of battery modules is odd or even; obtaining a casted member for an enclosure for the battery pack based on the determining of whether the number of battery modules is odd or even; and assembling the enclosure of the battery pack including the casted member.

The method may also include obtaining a first extruded sidewall and a second extruded sidewall for the battery modules based on the number of battery modules. Assembling the enclosure may include welding the first extruded sidewall to a first end of the casted member and welding the second extruded sidewall to a second end of the casted member.

Assembling the enclosure may also include welding an additional casted member to the first extruded sidewall and the second extruded sidewall, and attaching a base plate to the casted member, the additional casted member, the first extruded sidewall, and the second extruded sidewall. The method may also include: providing the battery modules in the enclosure; providing a high voltage distribution box to into a cavity in the casted member; closing the enclosure by attaching a lid to the casted member, the additional casted member, the first extruded sidewall, and the second extruded sidewall; and installing the battery pack in a vehicle. Identifying the number of battery modules to be included in the battery pack may include identifying the number of the battery modules based on a type of the vehicle.

BRIEF DESCRIPTION OF THE DRAWINGS

Certain features of the subject technology are set forth in the appended claims. However, for purpose of explanation, several embodiments of the subject technology are set forth in the following figures.

FIG. 13 is a flow chart of illustrative operations that may be performed for assembling an enclosure for a battery pack in accordance with one or more implementations.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

Aspects of the subject technology described herein relate to a configurable battery pack, such as configurable battery pack for electric vehicles.

Figure 1A:
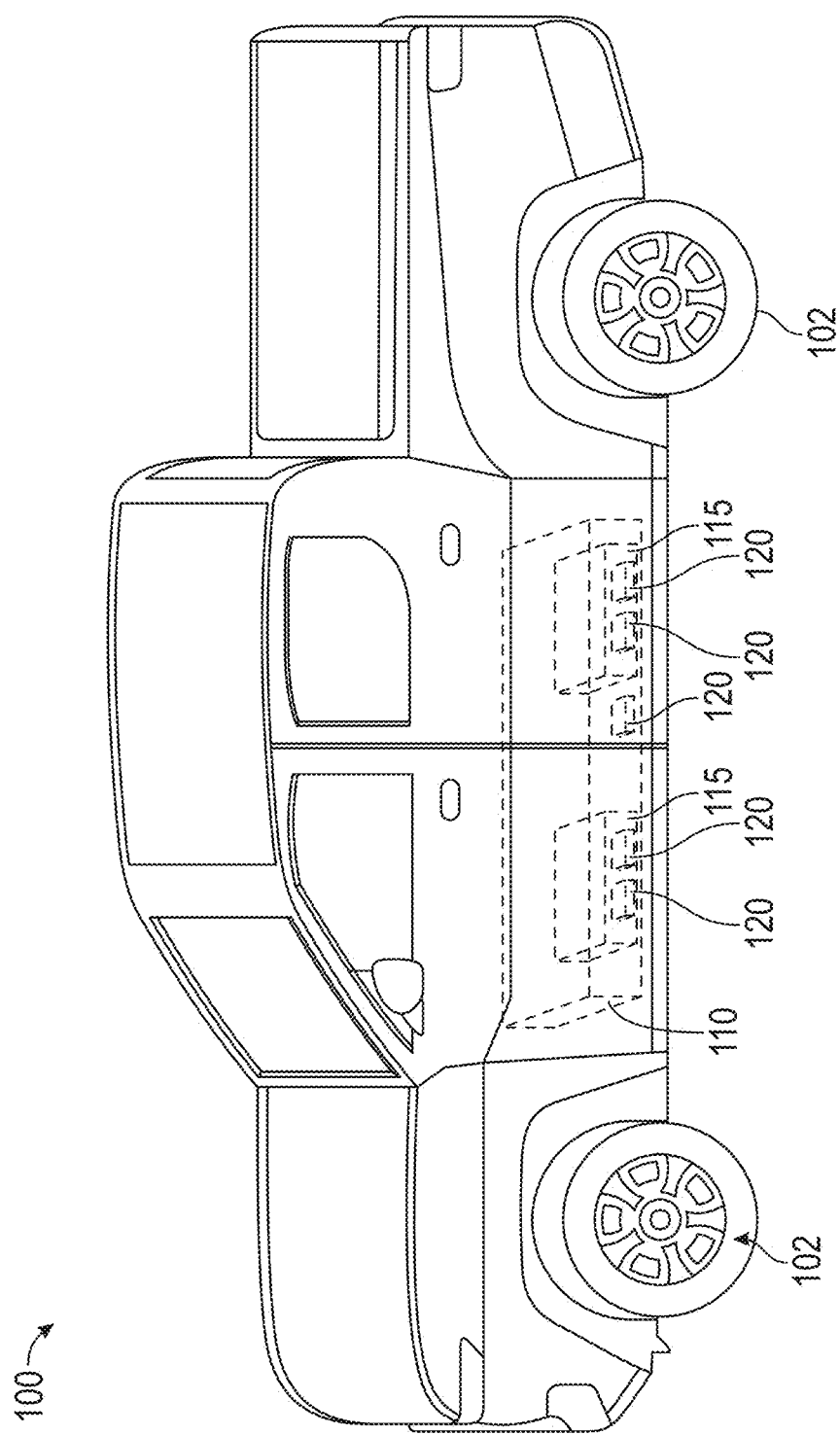
FIGS. 1A and 1B illustrate schematic perspective side views of example implementations of a vehicle having a battery pack in accordance with one or more implementations.

FIG. 1A is a diagram illustrating an example implementation of a moveable apparatus as described herein. In the example of FIG. 1A, a moveable apparatus is implemented as a vehicle 100. As shown, the vehicle 100 may include one or more battery packs, such as battery pack 110. The battery pack 110 may be coupled to one or more electrical systems of the vehicle 100 to provide power to the electrical systems.

In one or more implementations, the vehicle 100 may be an electric vehicle having one or more electric motors that drive the wheels 102 of the vehicle using electric power from the battery pack 110. In one or more implementations, the vehicle 100 may also, or alternatively, include one or more chemically powered engines, such as a gas-powered engine or a fuel cell powered motor. For example, electric vehicles can be fully electric or partially electric (e.g., hybrid or plug-in hybrid).

In the example of FIG. 1A, the vehicle 100 is implemented as a truck (e.g., a pickup truck) having a battery pack 110. As shown, the battery pack 110 may include one or more battery modules 115, which may include one or more battery cells 120. As shown in FIG. 1A, the battery pack 110 may also, or alternatively, include one or more battery cells 120 mounted directly in the battery pack 110 (e.g., in a cell-to-pack configuration). In one or more implementations, the battery pack 110 may be provided without any battery modules 115 and with the battery cells 120 mounted directly in the battery pack 110 (e.g., in a cell-to-pack configuration) and/or in other battery units that are installed in the battery pack 110. A vehicle battery pack can include multiple energy storage devices that can be arranged into such as battery modules or battery units. A battery unit or module can include an assembly of cells that can be combined with other elements (e.g., structural frame, thermal management devices) that can protect the assembly of cells from heat, shock and/or vibrations.

For example, the battery cell 120 can be included a battery, a battery unit, a battery module and/or a battery pack to power components of the vehicle 100. For example, a battery cell housing of the battery cell 120 can be disposed in the battery module 115, the battery pack 110, a battery array, or other battery unit installed in the vehicle 100.

As discussed in further detail hereinafter, the battery cells 120 may be provided with a battery cell housing that can be provided with any of various outer shapes. The battery cell housing may be a rigid housing in some implementations (e.g., for cylindrical or prismatic battery cells). The battery cell housing may also, or alternatively, be formed as a pouch or other flexible or malleable housing for the battery cell in some implementations. In various other implementations, the battery cell housing can be provided with any other suitable outer shape, such as a triangular outer shape, a square outer shape, a rectangular outer shape, a pentagonal outer shape, a hexagonal outer shape, or any other suitable outer shape. In some implementations, the battery pack 110 may not include modules (e.g., the battery pack may be module-free). For example, the battery pack 110 can have a module-free or cell-to-pack configuration in which the battery cells 120 are arranged directly into the battery pack 110 without assembly into a battery module 115. In one or more implementations, the vehicle 100 may include one or more busbars, electrical connectors, or other charge collecting, current collecting, and/or coupling components to provide electrical power from the battery pack 110 to various systems or components of the vehicle 100. In one or more implementations, the vehicle 100 may include control circuitry such as a power stage circuit that can be used to convert DC power from the battery pack 110 into AC power for one or more components and/or systems of the vehicle (e.g., including one or more power outlets of the vehicle and/or the motor(s) that drive the wheels 102 of the vehicle).

The power stage circuit can be provided as part of the battery pack 110 or separately from the battery pack 110 within the vehicle 100.

Figure 1B:
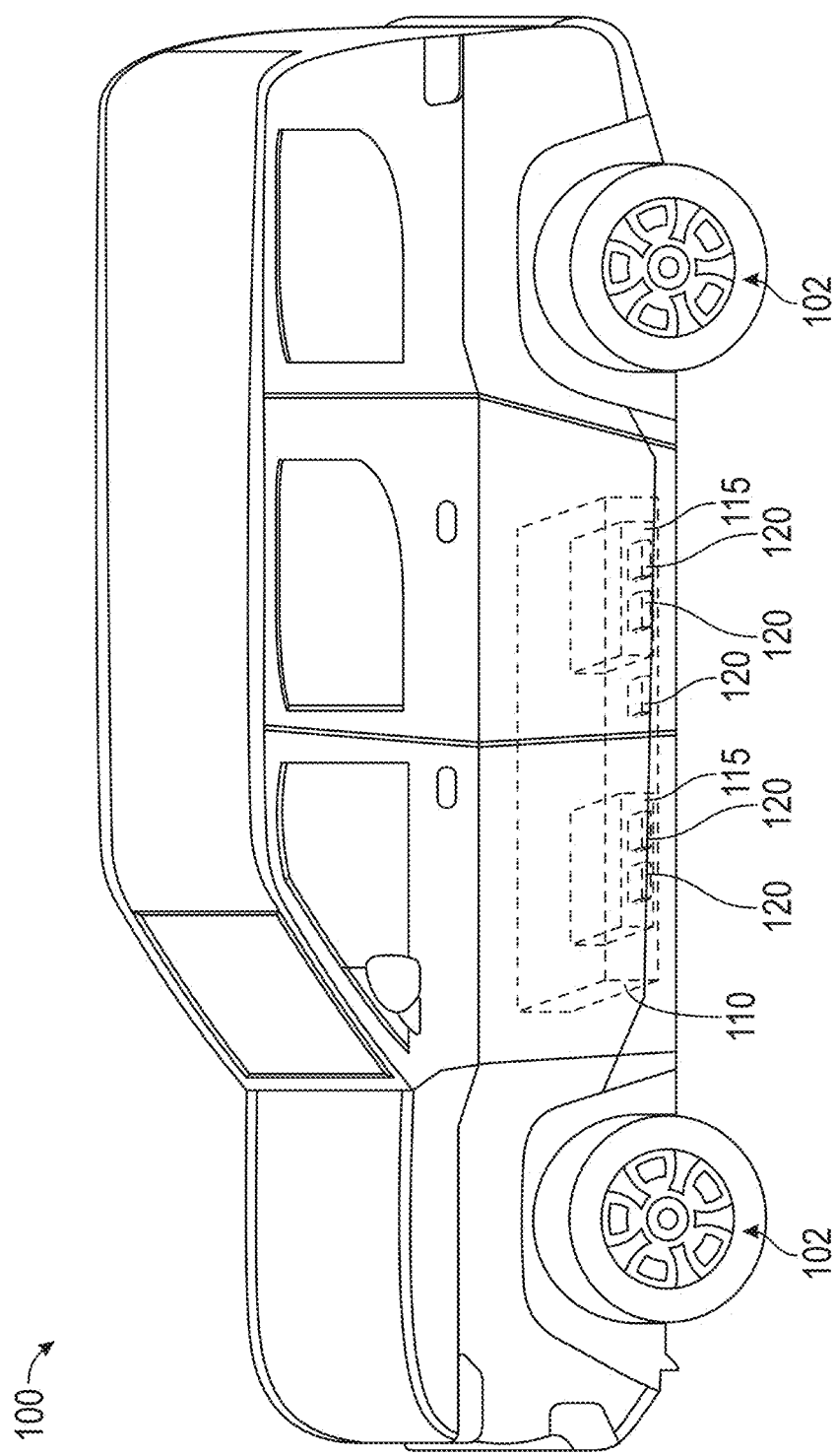

The example of FIG. 1A in which the vehicle 100 is implemented as a pickup truck having a truck bed at the rear portion thereof is merely illustrative. For example, FIG. 1B illustrates another implementation in which the vehicle 100 including the battery pack 110 is implemented as a sport utility vehicle (SUV), such as an electric sport utility vehicle. In the example of FIG. 1B, the vehicle 100 including the battery pack 110 may include a cargo storage area that is enclosed within the vehicle 100 (e.g., behind a row of seats within a cabin of the vehicle). In other implementations, the vehicle 100 may be implemented as another type of electric truck, an electric delivery van, an electric automobile, an electric car, an electric motorcycle, an electric scooter, an electric bicycle, an electric passenger vehicle, an electric passenger or commercial truck, a hybrid vehicle, an aircraft, a watercraft, and/or any other movable apparatus having a battery pack 110 (e.g., a battery pack or other battery unit that powers the propulsion or drive components of the moveable apparatus).

Figure 1C:
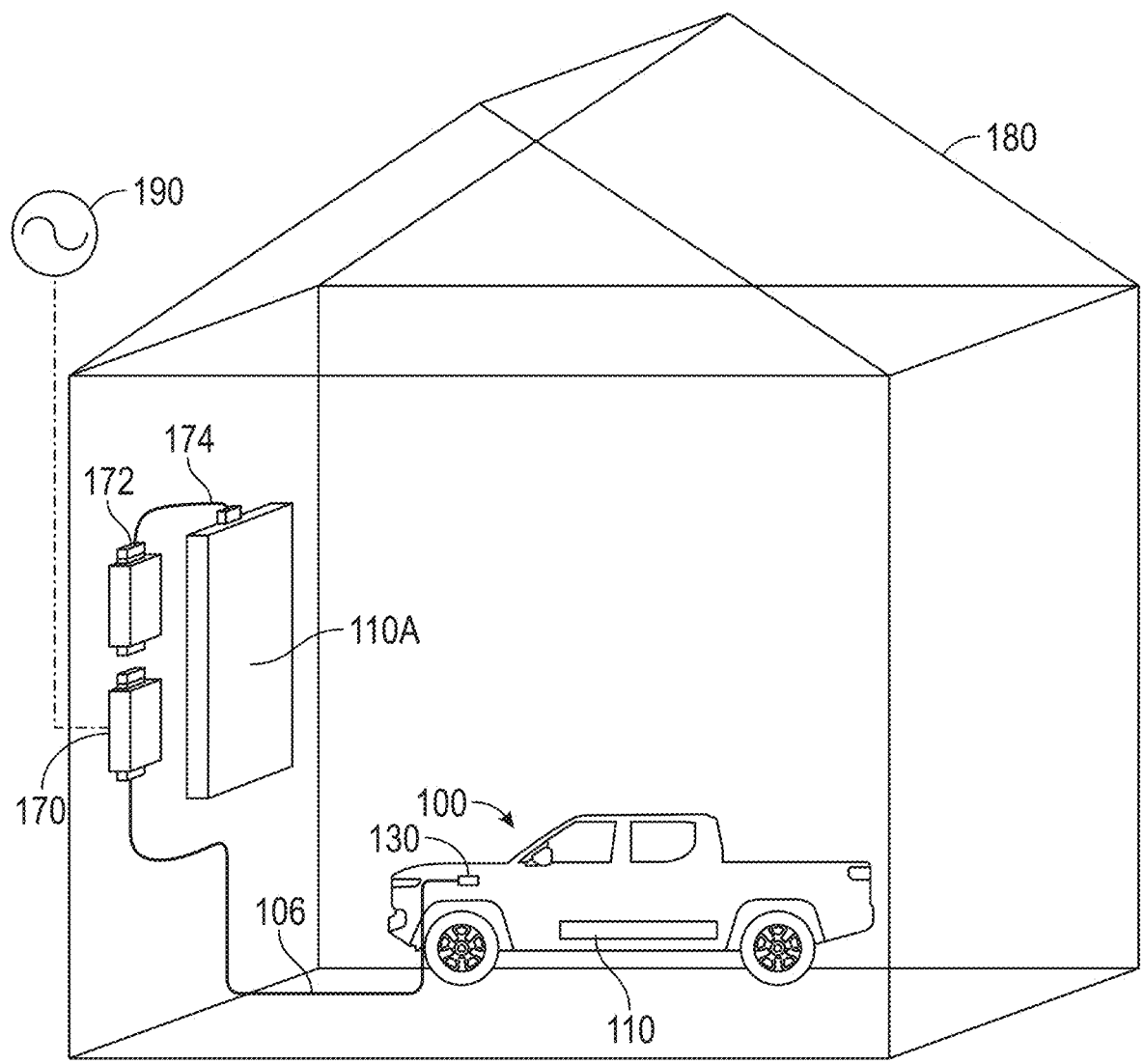
FIG. 1C illustrates a schematic perspective view of a building having a battery pack in accordance with one or more implementations.

In one or more implementations, a battery pack such as the battery pack 110, a battery module 115, a battery cell 120, and/or any other battery unit as described herein may also, or alternatively, be implemented as an electrical power supply and/or energy storage system in a building, such as a residential home or commercial building. For example, FIG. 1C illustrates an example in which a battery pack 110 is implemented in a building 180. For example, the building 180 may be a residential building, a commercial building, or any other building. As shown, in one or more implementations, a battery pack 110 may be mounted to a wall of the building 180.

As shown, the battery 110A that is installed in the building 180 may be couplable to the battery pack 110 in the vehicle 100, such as via: a cable/connector 106 that can be connected to the charging port 130 of the vehicle 100, electric vehicle supply equipment 170 (EVSE), a power stage circuit 172, and/or a cable/connector 174. For example, the cable/connector 106 may be coupled to the EVSE 170, which may be coupled to the battery 110A via the power stage circuit 172, and/or may be coupled to an external power source 190. In this way, either the external power source 190 or the battery 110A that is installed in the building 180 may be used as an external power source to charge the battery pack 110 in the vehicle 100 in some use cases. In some examples, the battery 110A that is installed in the building 180 may also, or alternatively, be coupled (e.g., via a cable/connector 174, the power stage circuit 172, and the EVSE 170) to the external power source 190. For example, the external power source 190 may be a solar power source, a wind power source, and/or an electrical grid of a city, town, or other geographic region (e.g., electrical grid that is powered by a remote power plant). During, for example, times when the battery pack 110 in the vehicle 100 is not coupled to the battery 110A that is installed in the building 180, the battery 110A that is installed in the building 180 can be coupled (e.g., using the power stage circuit 172 for the building 180) to the external power source 190 to charge up and store electrical energy. In some use cases, this stored electrical energy in the battery 110A that is installed in the building 180 can later be used to charge the battery pack 110 in the vehicle 100 (e.g., during times when solar power or wind power is not available, in the case of a regional or local power outage for the building 180, and/or during a period of high rates for access to the electrical grid).

In one or more implementations, the power stage circuit 172 may electrically couple the battery 110A that is installed in the building 180 to an electrical system of the building 180. For example, the power stage circuit 172 may convert DC power from the battery 110A into AC power for one or more loads in the building 180. For example, the battery 110A that is installed in the building 180 may be used to power one or more lights, lamps, appliances, fans, heaters, air conditioners, and/or any other electrical components or electrical loads in the building 180 (e.g., via one or more electrical outlets that are coupled to the battery 110A that is installed in the building 180). For example, the power stage circuit 172 may include control circuitry that is operable to switchably couple the battery 110A between the external power source 190 and one or more electrical outlets and/or other electrical loads in the electrical system of the building 180. In one or more implementations, the vehicle 100 may include a power stage circuit (not shown in FIG. 1C) that can be used to convert power received from the electric vehicle supply equipment 170 to DC power that is used to power/charge the battery pack 110 of the vehicle 100, and/or to convert DC power from the battery pack 110 into AC power for one or more electrical systems, components, and/or loads of the vehicle 100.

In one or more use cases, the battery 110A that is installed in the building 180 may be used as a source of electrical power for the building 180, such as during times when solar power or wind power is not available, in the case of a regional or local power outage for the building 180, and/or during a period of high rates for access to the electrical grid (as examples). In one or more other use cases, the battery pack 110 that is installed in the vehicle may be used to charge the battery 110A that is installed in the building 180 and/or to power the electrical system of the building 180 (e.g., in a use case in which the battery 110A that is installed in the building 180 is low on or out of stored energy and in which solar power or wind power is not available, a regional or local power outage occurs for the building 180, and/or a period of high rates for access to the electrical grid occurs (as examples)).

Figure 2A:
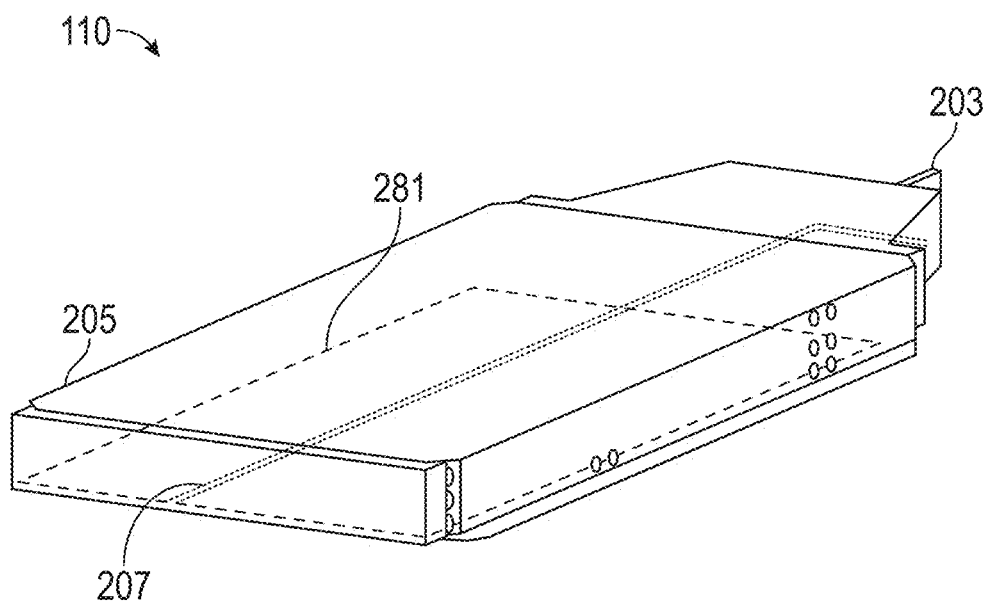
FIG. 2A illustrates a schematic perspective view of a battery pack in accordance with one or more implementations.

FIG. 2A depicts an example battery pack 110. Battery pack 110 may include multiple battery cells 120 (e.g., directly installed within the battery pack 110, or within batteries, battery units, and/or battery modules 115 as described herein) and/or battery modules 115, and one or more conductive coupling elements for coupling a voltage generated by the battery cells 120 to a power-consuming component, such as the vehicle 100 and/or an electrical system of a building 180. For example, the conductive coupling elements may include internal connectors and/or contactors that couple together multiple battery cells 120, battery units, batteries, and/or multiple battery modules 115 within an enclosure 205 to generate a desired output voltage for the battery pack 110. The battery pack 110 may also include one or more external connection ports, such as an electrical contact 203 (e.g., a high voltage terminal). For example, an electrical cable (e.g., cable/connector 106) may be connected between the electrical contact 203 and an electrical system of the vehicle 100 or the building 180, to provide electrical power to the vehicle 100 or the building 180.

As shown, the battery pack 110 may include an enclosure 205 (e.g., also referred to as a battery pack housing or pack frame). For example, the enclosure 205 may house or enclose one or more battery modules 115 and/or one or more battery cells 120, and/or other battery pack components. In one or more implementations, the enclosure 205 may include or form a shielding structure, such as a skid plate, on an outer surface thereof (e.g., a bottom thereof and/or underneath one or more battery module 115, battery units, batteries, and/or battery cells 120) to protect the battery module 115, battery units, batteries, and/or battery cells 120 from external conditions (e.g., if the battery pack 110 is installed in a vehicle 100 and the vehicle 100 is driven over rough terrain, such as off-road terrain, trenches, rocks, rivers, streams, etc.).

In one or more implementations, the battery pack 110 may include one or more thermal control structures 207 (e.g., cooling lines and/or plates and/or heating lines and/or plates). For example, thermal control structures 207 may couple thermal control structures and/or fluids to the battery modules 115, battery units, batteries, and/or battery cells 120 within the enclosure 205, such as by distributing fluid through the battery pack 110.

For example, the thermal control structures 207 may form a part of a thermal/temperature control or heat exchange system that includes one or more thermal components 281 such as plates or bladders that are disposed in thermal contact with one or more battery modules 115 and/or battery cells 120 disposed within the enclosure 205. For example, a thermal component 281 may be positioned in contact with one or more battery modules 115, battery units, batteries, and/or battery cells 120 within the enclosure 205. In one or more implementations, the battery pack 110 may include one or multiple thermal control structures 207 and/or other thermal components for each of several top and bottom battery module pairs. As shown, the battery pack 110 may include an electrical contact 203 (e.g., a high voltage connector) by which an external load (e.g., the vehicle 100 or an electrical system of the building 180) may be electrically coupled to the battery modules and/or battery cells in the battery pack 110.

Figure 2B:
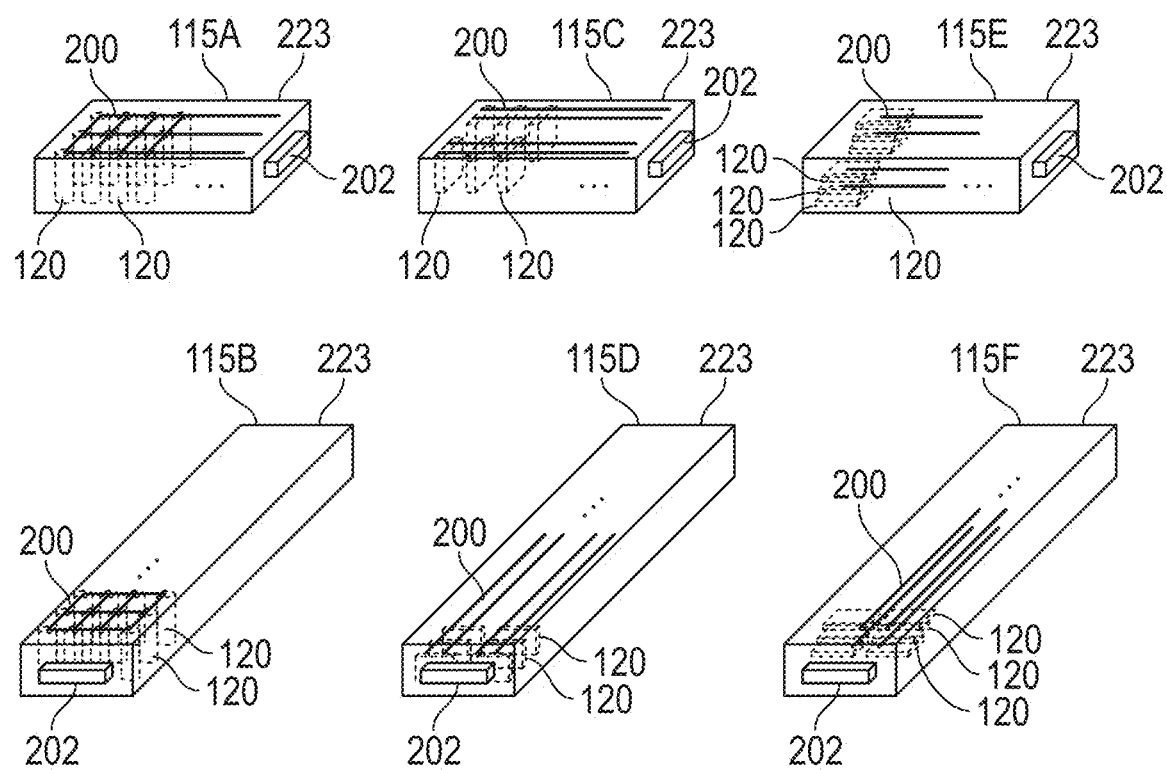
FIG. 2B illustrates schematic perspective views of various battery modules that may be included in a battery pack in accordance with one or more implementations.

FIG. 2B depicts various examples of battery modules 115 that may be disposed in the battery pack 110 (e.g., within the enclosure 205 of FIG. 2A). In the example of FIG. 2B, a battery module 115A is shown that includes a battery module housing 223 having a rectangular cuboid shape with a length that is substantially similar to its width. In this example, the battery module 115A includes multiple battery cells 120 implemented as cylindrical battery cells. In this example, the battery module 115A includes rows and columns of cylindrical battery cells that are coupled together by an interconnect structure 200 (e.g., a current connector assembly or CCA). For example, the interconnect structure 200 may couple together the positive terminals of the battery cells 120, and/or couple together the negative battery terminals of the battery cells 120. As shown, the battery module 115A may include a charge collector or bus bar 202. For example, the bus bar 202 may be electrically coupled to the interconnect structure 200 to collect the charge generated by the battery cells 120 to provide a high voltage output from the battery module 115A.

FIG. 2B also shows a battery module 115B having an elongate shape, in which the length of the battery module housing 223 (e.g., extending along a direction from a front end of the battery pack 110 to a rear end of the battery pack 110 when the battery module 115B is installed in the battery pack 110) is substantially greater than a width (e.g., in a transverse direction to the direction from the front end of the battery pack 110 to the rear end of the battery pack 110 when the battery module 115B is installed in the battery pack 110) of the battery module housing 223. For example, one or more battery modules 115B may span the entire front-to-back length of a battery pack within the enclosure 205. As shown, the battery module 115B may also include a bus bar 202 electrically coupled to the interconnect structure 200. For example, the bus bar 202 may be electrically coupled to the interconnect structure 200 to collect the charge generated by the battery cells 120 to provide a high voltage output from the battery module 115B.

In the implementations of battery module 115A and battery module 115B, the battery cells 120 are implemented as cylindrical battery cells. However, in other implementations, a battery module may include battery cells having other form factors, such as a battery cells having a right prismatic outer shape (e.g., a prismatic cell), or a pouch cell implementation of a battery cell. As an example, FIG. 2B also shows a battery module 115C having a battery module housing 223 having a rectangular cuboid shape with a length that is substantially similar to its width and including multiple battery cells 120 implemented as prismatic battery cells. In this example, the battery module 115C includes rows and columns of prismatic battery cells that are coupled together by an interconnect structure 200 (e.g., a current collector assembly or CCA). For example, the interconnect structure 200 may couple together the positive terminals of the battery cells 120 and/or couple together the negative battery terminals of the battery cells 120. As shown, the battery module 115C may include a charge collector or bus bar 202. For example, the bus bar 202 may be electrically coupled to the interconnect structure 200 to collect the charge generated by the battery cells 120 to provide a high voltage output from the battery module 115C.

FIG. 2B also shows a battery module 115D including prismatic battery cells and having an elongate shape, in which the length of the battery module housing 223 (e.g., extending along a direction from a front end of the battery pack 110 to a rear end of the battery pack 110 when the battery module 115D is installed in the battery pack 110) is substantially greater than a width (e.g., in a transverse direction to the direction from the front end of the battery pack 110 to the rear end of the battery pack 110 when the battery module 115D is installed in the battery pack 110) of the battery module housing 223. For example, one or more battery modules 115D having prismatic battery cells may span the entire front-to-back length of a battery pack within the enclosure 205. As shown, the battery module 115D may also include a bus bar 202 electrically coupled to the interconnect structure 200. For example, the bus bar 202 may be electrically coupled to the interconnect structure 200 to collect the charge generated by the battery cells 120 to provide a high voltage output from the battery module 115D.

As another example, FIG. 2B also shows a battery module 115E having a battery module housing 223 having a rectangular cuboid shape with a length that is substantially similar to its width and including multiple battery cells 120 implemented as pouch battery cells. In this example, the battery module 115C includes rows and columns of pouch battery cells that are coupled together by an interconnect structure 200 (e.g., a current collector assembly or CCA). For example, the interconnect structure 200 may couple together the positive terminals of the battery cells 120 and couple together the negative battery terminals of the battery cells 120. As shown, the battery module 115E may include a charge collector or bus bar 202. For example, the bus bar 202 may be electrically coupled to the interconnect structure 200 to collect the charge generated by the battery cells 120 to provide a high voltage output from the battery module 115E.

FIG. 2B also shows a battery module 115F including pouch battery cells and having an elongate shape in which the length of the battery module housing 223 (e.g., extending along a direction from a front end of the battery pack 110 to a rear end of the battery pack 110 when the battery module 115E is installed in the battery pack 110) is substantially greater than a width (e.g., in a transverse direction to the direction from the front end of the battery pack 110 to the rear end of the battery pack 110 when the battery module 115E is installed in the battery pack 110) of the battery module housing 223. For example, one or more battery modules 115E having pouch battery cells may span the entire front-to-back length of a battery pack within the enclosure 205. As shown, the battery module 115E may also include a bus bar 202 electrically coupled to the interconnect structure 200. For example, the bus bar 202 may be electrically coupled to the interconnect structure 200 to collect the charge generated by the battery cells 120 to provide a high voltage output from the battery module 115E.

In various implementations, a battery pack 110 may be provided with one or more of any of the battery modules 115A, 115B, 115C, 115D, 115E, and 115F. In one or more other implementations, a battery pack 110 may be provided without battery modules 115 (e.g., in a cell-to-pack implementation).

In one or more implementations, multiple battery modules 115 in any of the implementations of FIG. 2B may be coupled (e.g., in series) to a current collector of the battery pack 110. In one or more implementations, the current collector may be coupled, via a high voltage harness, to one or more external connectors (e.g., electrical contact 203) on the battery pack 110. In one or more implementations, the battery pack 110 may be provided without any battery modules 115. For example, the battery pack 110 may have a cell-to-pack configuration in which battery cells 120 are arranged directly into the battery pack 110 without assembly into a battery module 115 (e.g., without including a separate battery module housing 223). For example, the battery pack 110 (e.g., the enclosure 205) may include or define a plurality of structures for positioning of the battery cells 120 directly within the enclosure 205.

Figure 2C:
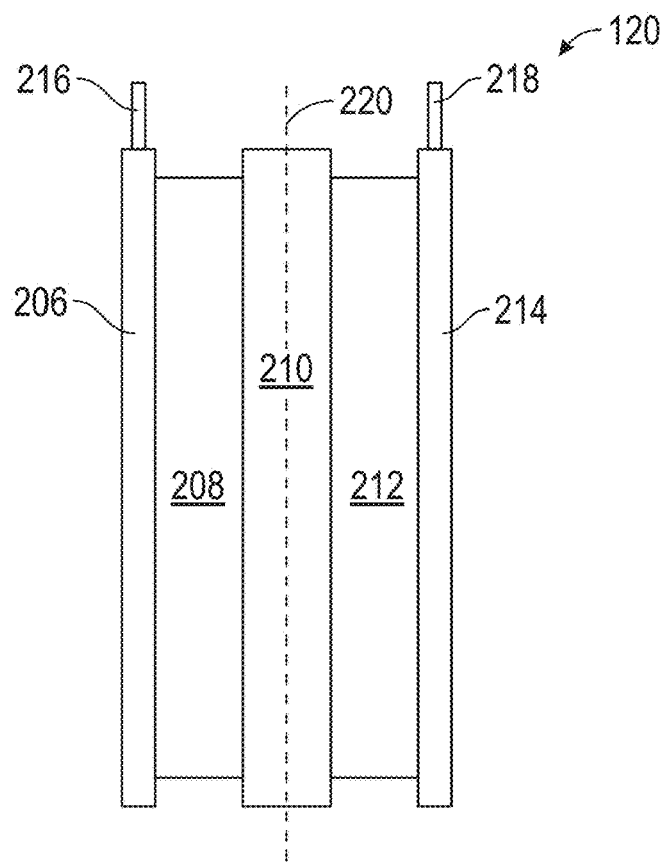
FIG. 2C illustrates a cross-sectional end view of a battery cell in accordance with one or more implementations.

FIG. 2C illustrates a cross-sectional end view of a portion of a battery cell 120. As shown in FIG. 2C, a battery cell 120 may include an anode 208, an electrolyte 210, and a cathode 212. As shown, the anode 208 may include or be electrically coupled to a first current collector 206 (e.g., a metal layer such as a layer of copper foil or other metal foil). As shown, the cathode 212 may include or be electrically coupled to a second current collector 214 (e.g., a metal layer such as a layer of aluminum foil or other metal foil). As shown, the battery cell 120 may include a first terminal 216 (e.g., a negative terminal) coupled to the anode 208 (e.g., via the first current collector 206) and a second terminal 218 (e.g., a positive terminal) coupled to the cathode (e.g., via the second current collector 214). In various implementations, the electrolyte 210 may be a liquid electrolyte layer or a solid electrolyte layer. In one or more implementations (e.g., implementations in which the electrolyte 210 is a liquid electrolyte layer), the battery cell 120 may include a separator layer 220 that separates the anode 208 from the cathode 212. In one or more implementations in which the electrolyte 210 is a solid electrolyte layer, the solid electrolyte layer may act as both separator layer and an electrolyte layer.

In one or more implementations, the battery cell 120 may be implemented as a lithium ion battery cell in which the anode 208 is formed from a carbonaceous material (e.g., graphite or silicon-carbon). In these implementations, lithium ions can move from the anode 208, through the electrolyte 210, to the cathode 212 during discharge of the battery cell 120 (e.g., and through the electrolyte 210 from the cathode 212 to the anode 208 during charging of the battery cell 120). For example, the anode 208 may be formed from a graphite material that is coated on a copper foil corresponding to the first current collector 206. In these lithium ion implementations, the cathode 212 may be formed from one or more metal oxides (e.g., a lithium cobalt oxide, a lithium manganese oxide, a lithium nickel manganese cobalt oxide (NMC), or the like) and/or a lithium iron phosphate. As shown, the battery cell 120 may include a separator layer 220 that separates the anode 208 from the cathode 212. In an implementation in which the battery cell 120 is implemented as a lithium-ion battery cell, the electrolyte 210 may include a lithium salt in an organic solvent. The separator layer 220 may be formed from one or more insulating materials (e.g., a polymer such as polyethylene, polypropylene, polyolefin, and/or polyamide, or other insulating materials such as rubber, glass, cellulose or the like). The separator layer 220 may prevent contact between the anode 208 and the cathode 212, and may be permeable to the electrolyte 210 and/or ions within the electrolyte 210. In one or more implementations, the battery cell 120 may be implemented as a lithium polymer battery cell having a dry solid polymer electrolyte and/or a gel polymer electrolyte.

Although some examples are described herein in which the battery cells 120 are implemented as lithium-ion battery cells, some or all of the battery cells 120 in a battery module 115, battery pack 110, or other battery or battery unit may be implemented using other battery cell technologies, such as nickel-metal hydride battery cells, sodium ion battery cells, lead-acid battery cells, and/or ultracapacitor cells. For example, in a nickel-metal hydride battery cell, the anode 208 may be formed from a hydrogen-absorbing alloy and the cathode 212 may be formed from a nickel oxide-hydroxide. In the example of a nickel-metal hydride battery cell, the electrolyte 210 may be formed from an aqueous potassium hydroxide in one or more examples.

The battery cell 120 may be implemented as a lithium sulfur battery cell in one or more other implementations. For example, in a lithium sulfur battery cell, the anode 208 may be formed at least in part from lithium, the cathode 212 may be formed from at least in part form sulfur, and the electrolyte 210 may be formed from a cyclic ether, a short-chain ether, a glycol ether, an ionic liquid, a super-saturated salt-solvent mixture, a polymer-gelled organic media, a solid polymer, a solid inorganic glass, and/or other suitable electrolyte materials.

Figure 2D:
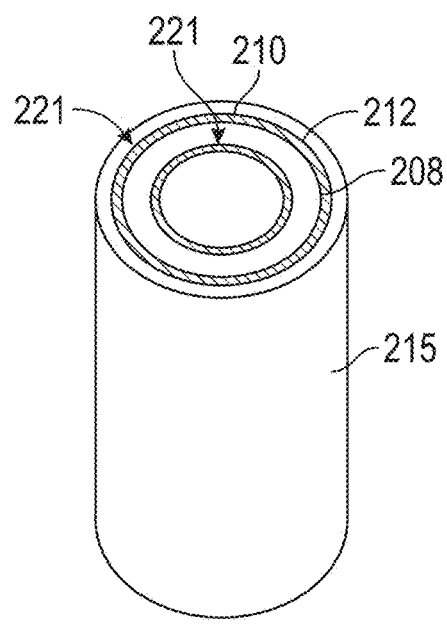
FIG. 2D illustrates a cross-sectional perspective view of a cylindrical battery cell in accordance with one or more implementations.

In various implementations, the anode 208, the electrolyte 210, and the cathode 212 of FIG. 2C can be packaged into a battery cell housing having any of various shapes, and/or sizes, and/or formed from any of various suitable materials. For example, battery cells 120 can have a cylindrical, rectangular, square, cubic, flat, pouch, elongated, or prismatic outer shape. As depicted in FIG. 2D, for example, a battery cell such as the battery cell 120 may be implemented as a cylindrical cell. In the example of FIG. 2D, the battery cell 120 includes a cell housing 215 having a cylindrical outer shape. For example, the anode 208, the electrolyte 210, and the cathode 212 may be rolled into one or more substantially cylindrical windings 221. As shown, one or more windings 221 of the anode 208, the electrolyte 210, and the cathode 212 (e.g., and/or one or more separator layers such as separator layer 220) may be disposed within the cell housing 215. For example, a separator layer may be disposed between adjacent ones of the windings 221. However, the cylindrical cell implementation of FIG. 2D is merely illustrative, and other implementations of the battery cells 120 are contemplated.

Figure 2E:
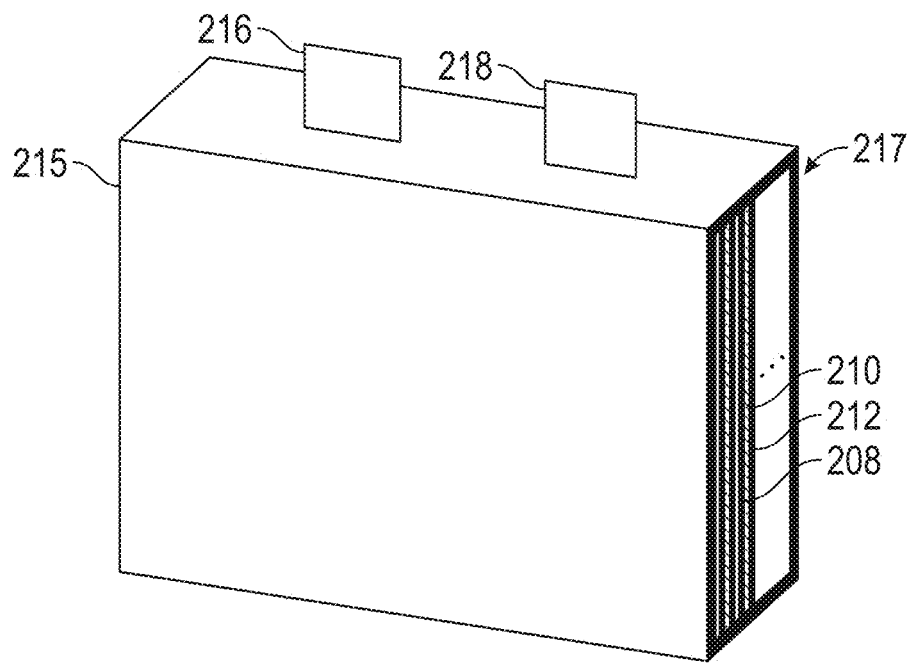
FIG. 2E illustrates a cross-sectional perspective view of a prismatic battery cell in accordance with one or more implementations.

For example, FIG. 2E illustrates an example in which the battery cell 120 is implemented as a prismatic cell. As shown in FIG. 2E, the battery cell 120 may have a cell housing 215 having a right prismatic outer shape. As shown, one or more layers of the anode 208, the cathode 212, and the electrolyte 210 disposed therebetween may be disposed (e.g., with separator materials between the layers) within the cell housing 215 having the right prismatic shape. As examples, multiple layer of the anode 208, electrolyte 210, and cathode 212 can be stacked (e.g., with separator materials between each layer), or a single layer of the anode 208, electrolyte 210, and cathode 212 can be formed into a flattened spiral shape and provided in the cell housing 215 having the right prismatic shape. In the implementation of FIG. 2E, the cell housing 215 has a relatively thick cross-sectional width 217 and is formed from a rigid material. For example, the cell housing 215 in the implementation of FIG. 2E may be formed from a welded, stamped, deep drawn, and/or impact extruded metal sheet, such as a welded, stamped, deep drawn, and/or impact extruded aluminum sheet. For example, the cross-sectional width 217 of the cell housing 215 of FIG. 2E may be as much as, or more than 1 millimeter (mm) to provide a rigid housing for the prismatic battery cell. In one or more implementations, the first terminal 216 and the second terminal 218 in the prismatic cell implementation of FIG. 2E may be formed from a feedthrough conductor that is insulated from the cell housing 215 (e.g., a glass to metal feedthrough) as the conductor passes through to cell housing 215 to expose the first terminal 216 and the second terminal 218 outside the cell housing 215 (e.g., for contact with an interconnect structure 200 of FIG. 2B). However, this implementation of FIG. 2E is also illustrative and yet other implementations of the battery cell 120 are contemplated.

Figure 2F:
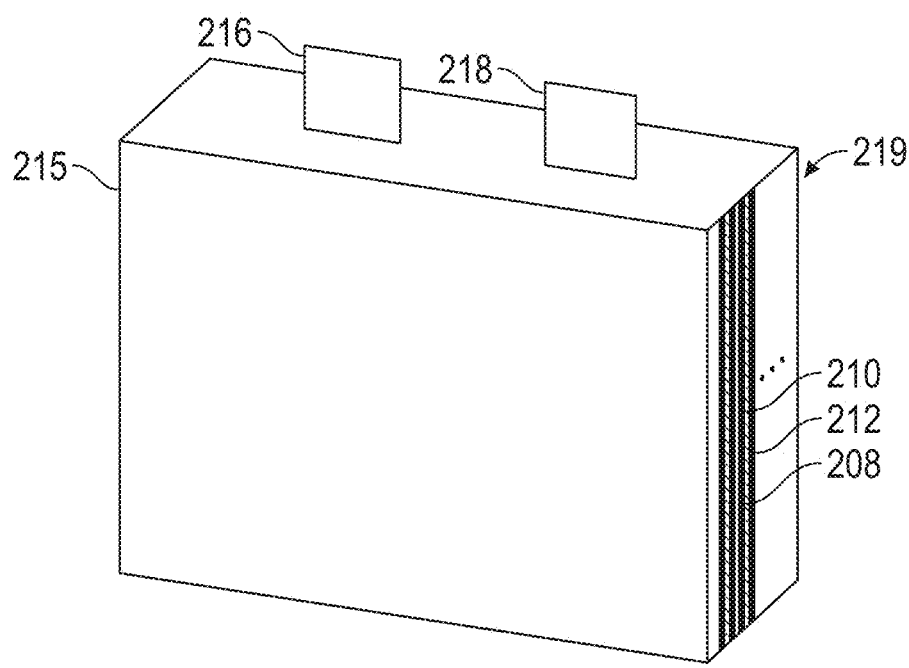
FIG. 2F illustrates a cross-sectional perspective view of a pouch battery cell in accordance with one or more implementations.

For example, FIG. 2F illustrates an example in which the battery cell 120 is implemented as a pouch cell. As shown in FIG. 2F, one or more layers of the anode 208, the cathode 212, and the electrolyte 210 disposed therebetween may be disposed (e.g., with separator materials between the layers) within the cell housing 215 that forms a flexible or malleable pouch housing. In the implementation of FIG. 2F, the cell housing 215 has a relatively thin cross-sectional width 219. For example, the cell housing 215 in the implementation of FIG. 2F may be formed from a flexible or malleable material (e.g., a foil, such as a metal foil, or film, such as an aluminum-coated plastic film). For example, the cross-sectional width 219 of the cell housing 215 of FIG. 2F may be as low as, or less than 0.1 mm, 0.05 mm, 0.02 mm, or 0.01 mm to provide flexible or malleable housing for the pouch battery cell. In one or more implementations, the first terminal 216 and the second terminal 218 in the pouch cell implementation of FIG. 2F may be formed from conductive tabs (e.g., foil tabs) that are coupled (e.g., welded) to the anode 208 and the cathode 212 respectively, and sealed to the pouch that forms the cell housing 215 in these implementations. In the examples of FIGS. 2C, 2E, and 2F, the first terminal 216 and the second terminal 218 are formed on the same side (e.g., a top side) of the battery cell 120. However, this is merely illustrative and, in other implementations, the first terminal 216 and the second terminal 218 may formed on two different sides (e.g., opposing sides, such as a top side and a bottom side) of the battery cell 120. The first terminal 216 and the second terminal 218 may be formed on a same side or difference sides of the cylindrical cell of FIG. 2D in various implementations.

In one or more implementations, a battery module 115, a battery pack 110, a battery unit, or any other battery may include some battery cells 120 that are implemented as solid-state battery cells and other battery cells 120 that are implemented with liquid electrolytes for lithium-ion or other battery cells having liquid electrolytes. One or more of the battery cells 120 may be included a battery module 115 or a battery pack 110, such as to provide an electrical power supply for components of the vehicle 100, the building 180, or any other electrically powered component or device. The cell housing 215 of the battery cell 120 can be disposed in the battery module 115, the battery pack 110, or installed in any of the vehicle 100, the building 180, or any other electrically powered component or device.

Figure 3:
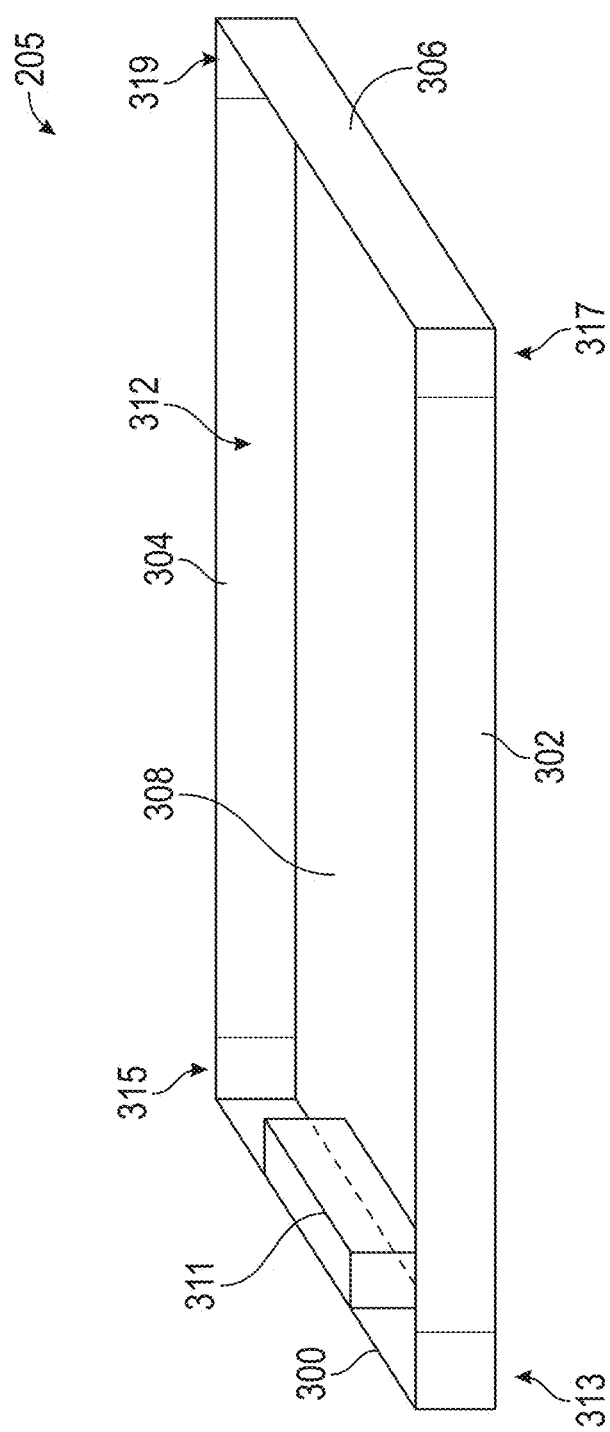
FIG. 3 illustrates a perspective view of an enclosure for a battery pack in accordance with one or more implementations.

FIG. 3 illustrates an schematic perspective view of an enclosure 205 for the battery pack 110. In this example, the enclosure 205 may include a casted member 300, an extruded sidewall structure 302, an extruded sidewall structure 304, a casted member 306, and a base plate. For example, the casted member 300 may be a monolithic, unitary member that has been formed from, for example, metal (e.g., aluminum, steel, another metal, and/or an alloy thereof) in a casting operation (e.g., a die casting operation). The casted member 300 may be a casted front member for the enclosure 205, configured for positioning near or toward a front of a vehicle in which battery pack 110 is installed. For example, the casted member 300 may form a front wall of the enclosure 205, and may have an outer surface that defines the front surface of the enclosure 205 and the battery pack 110. As shown, the casted member 300 may include end portion 313 and 315 that bend way from the front wall to form respective portions of respective sidewalls of the enclosure 205.

The casted member 306 may be a monolithic, unitary member that has been formed from, for example, metal (e.g., aluminum, steel, another metal, and/or an alloy thereof) in a casting operation (e.g., a die casting operation). The casted member 306 may be a casted rear member for the enclosure 205, configured for positioning near or toward a rear of a vehicle in which battery pack 110 is installed. For example, the casted member 306 may form a rear wall of the enclosure 205, and may have an outer surface that defines the rear surface of the enclosure 205 and the battery pack 110. As shown, the casted member 306 may include end portion 317 and 319 that bend way from the rear wall to form respective portions of the respective sidewalls of the enclosure 205. The end portions 313 and 315 of the casted member 300, and the end portions 317 and 319 of the casted member 306, may allow the extruded sidewall structure 302 and the extruded sidewall structure 304 to be substantially linear sidewall structures that each extend along a substantially straight path between the casted member 300 and the casted member 306. In this way, and as discussed in further detail hereinafter, the extruded sidewall structure 302 and the extruded sidewall structure 304 may be able to be cut to various lengths to accommodate various numbers of battery modules in battery packs of various respective sizes.

As shown, the casted member 300 may include and/or define a cavity 311. As described in further detail hereinafter, the cavity 311 may be configured to enclosure electrical circuitry, such as a high voltage distribution box (HVDB) that is electrically coupled to one or more battery modules 115 and/or battery cells 120 of the battery pack 110. For example, the battery modules 115 and/or battery cells 120 may be enclosed in an additional cavity 312, separate from the cavity 311, defined in part by the extruded sidewall structure 302 and the extruded sidewall structure 304 (e.g., and by the casted member 300 and the casted member 306).

For example, the extruded sidewall structure 302 may be a single monolithic unitary structure that has been formed from, for example, metal (e.g., aluminum, steel, another metal, and/or an alloy thereof) in an extrusion operation. Following extrusion, the extruded metal structure may have been cut to a desired length, as described in further detail hereinafter. The extruded sidewall structure 304 may be a single monolithic unitary structure that has been formed from, for example, metal (e.g., aluminum, steel, another metal, and/or an alloy thereof) in an extrusion operation. Following extrusion, the extruded metal structure may have been cut to a desired length, as described in further detail hereinafter.

Figure 4:
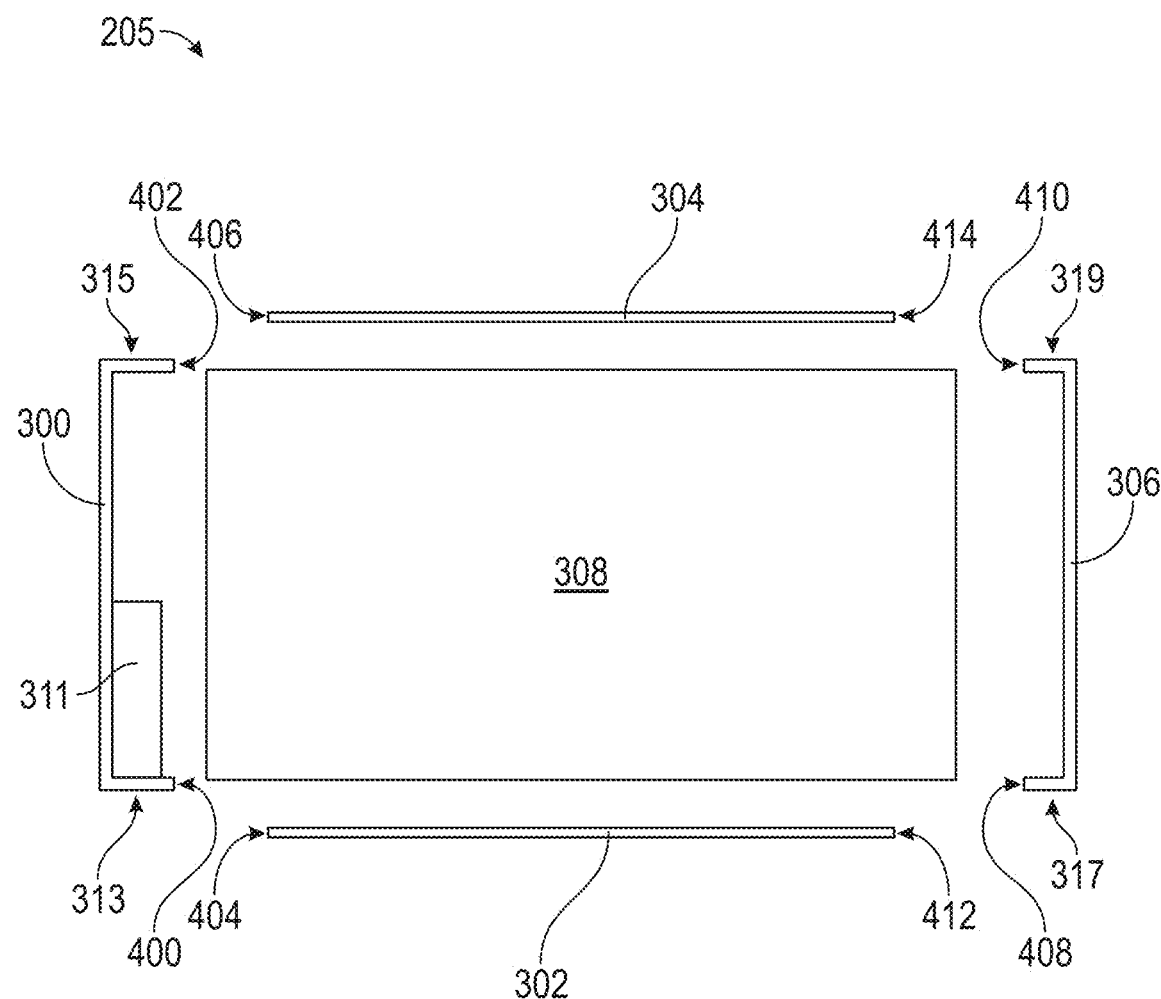
FIG. 4 illustrates an exploded top view of an enclosure for a battery pack in accordance with one or more implementations.

FIG. 4 illustrates an exploded top view of the enclosure 205 of FIG. 3. As shown in FIG. 4, the casted member 300 may include a first end surface 400 that is connectable (e.g., configured to be welded, fastened, or otherwise attached) to a first end surface 404 of the extruded sidewall structure 302 and a second end surface 402 that is connectable (e.g., configured to be welded, fastened, or otherwise attached) to a first end surface 406 of the extruded sidewall structure 304. The casted member 306 may include a first end surface 408 configured to be welded to a second end surface 412 of the extruded sidewall structure 302 and a second end surface 410 configured to be welded to a second end surface 414 of the extruded sidewall structure 304. The base plate 308 may be attached to (e.g., bottom surfaces of) the casted member 300, the extruded sidewall structure 302, the casted member 306, and the extruded sidewall structure 304 via welding and/or via one or more fasteners such as screws or bolts to form the enclosure 205. In one or more implementations, a lid (not shown in FIGS. 3 and 4) may be attached to (e.g., top surfaces of) the casted member 300, the extruded sidewall structure 302, the casted member 306, and the extruded sidewall structure 304 via welding and/or via one or more fasteners such as screws or bolts to close the enclosure 205 (e.g., after one or more battery modules, battery cells, cooling structures, and/or other electrical, structural, and/or thermal components have been installed in the cavity 312 and/or the cavity 311).

As discussed herein, the enclosure 205 may be a configurable enclosure that is capable of being sized and/or shaped to accommodate various different numbers of battery modules and/or battery cells therewithin. For example, the configurable enclosure may be configured to hold a relatively smaller number of battery modules (e.g., three battery modules, four battery modules, or five battery modules) for a relatively lighter vehicle or for a relatively low range type of a vehicle, and the configurable enclosure may be configured to hold a relatively larger number of battery modules (e.g., six battery modules, seven battery modules, eight battery modules, or nine battery modules) for a relatively heavier vehicle or for a relatively higher range type of a vehicle. By providing a configurable enclosure as described herein, battery packs for multiple different vehicle types can be efficiently assembled from the a common set of interchangeable parts (e.g., the casted member 300, the extruded sidewall structure 302, the casted member 306, the extruded sidewall structure 304, the base plate 308, and/or the battery modules 115).

Figure 5:
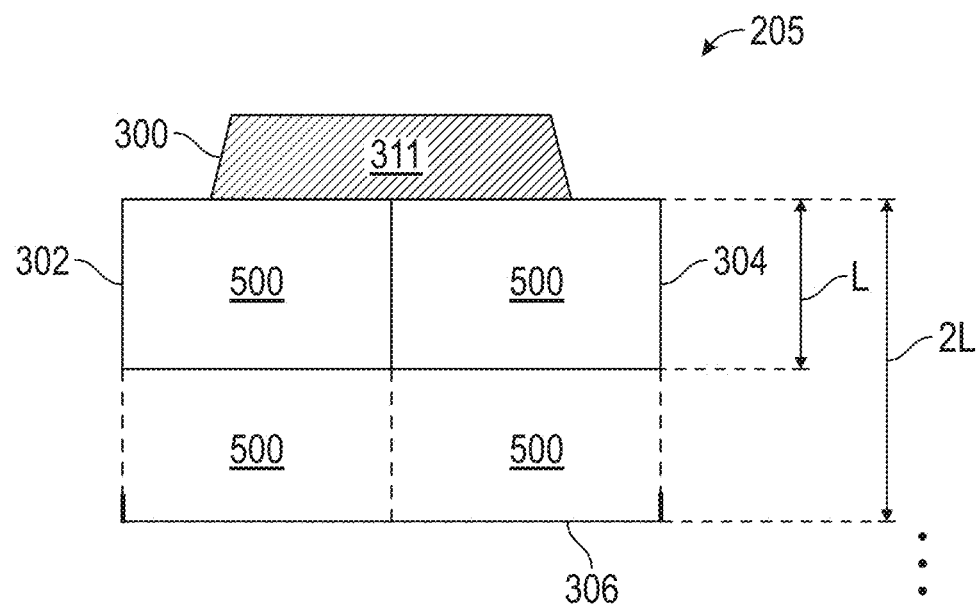
FIG. 5 illustrates a schematic top view of an enclosure for a battery pack with an even number of battery modules in accordance with one or more implementations.

In one or more implementations, the casted member 300 may have a shape that is based on a number of battery modules 115 to be included in the enclosure 205 of the battery pack 110. For example, FIG. 5 illustrates a schematic top view of the enclosure 205 configured for an even number of battery modules. As shown in FIG. 5, the casted member 300 includes the cavity 311 (e.g., for an HVDB and/or other electrical distribution and/or current collection components), without including space for a battery module therewithin.

Figure 6:
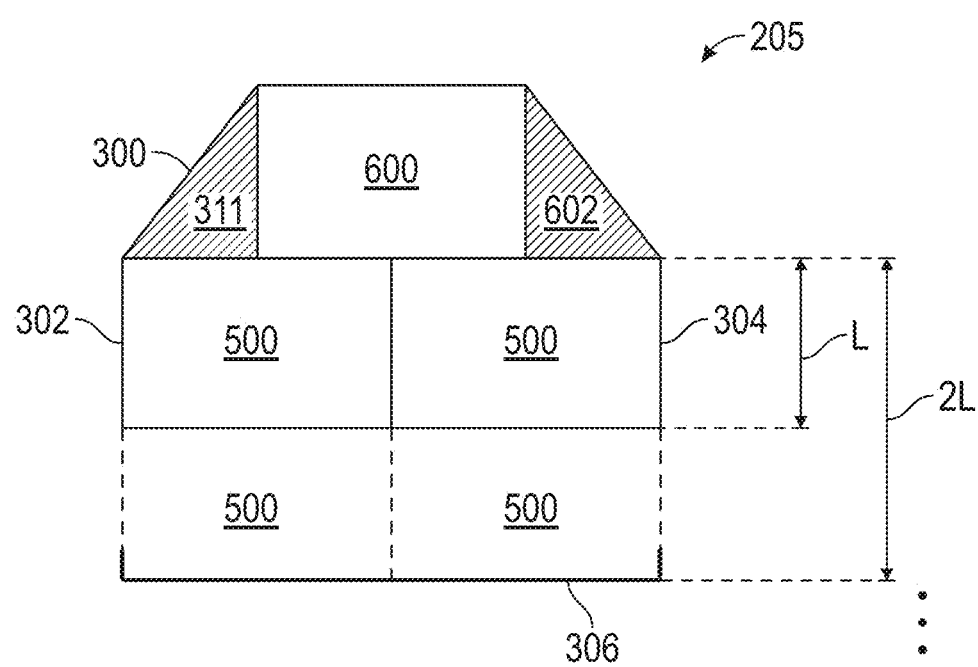
FIG. 6 illustrates a schematic top view of an enclosure for a battery pack with an odd number of battery modules in accordance with one or more implementations.

In contrast, FIG. 6 illustrates a schematic top view of the enclosure 205 configured for an odd number of battery modules. As shown in FIG. 6, the casted member 300 may include the cavity 311 (e.g., for an HVDB and/or other electrical distribution and/or current collection components), and may include an additional cavity 600 that is configured to receive a battery module 115. As shown, the casted member 300 in the example of FIG. 6 may also, optionally, include a cavity 602 on an opposite side of the casted member 300 from the cavity 311. The cavity 602 may also be configured to enclose one or more components of the battery pack 110.

In each of the examples of FIGS. 5 and 6, the extruded sidewall structures 302 and 304 have a length that is configurable based on the number of battery modules to be included in the enclosure 205. For example, FIGS. 5 and 6 illustrate how the extruded sidewall structures 302 and 304 may have a length, L, that is sufficient to enclose a single row of one or more battery modules 115 (e.g., each in a portion 500 of the cavity 312 defined by the casted member 300, the extruded sidewall structures 302 and 304, and the casted member 306), a length, 2L, that is sufficient to enclose two rows of one or more battery modules 115 in portions 500 of the cavity 312, or other lengths (e.g., 3L, 4L, etc.) based on the number of battery modules.

In one or more implementations, assembling a battery pack 110 may include assembling an enclosure 205, at least in part by determining the number of battery modules 115 to be included in the battery pack 110, determining whether the number of battery modules is odd or even, obtaining the casted member 300 of FIG. 5 if the number of battery modules is even, obtaining the casted member 300 of FIG. 6 if the number of battery modules is odd, obtaining extruded sidewall structures 302 and 304 having a length that is based on the number of battery modules (e.g., by obtaining the extruded sidewall structures 302 and 304 having a first length corresponding to a maximum number of battery cells, and cutting the extruded sidewall structures 302 and 304 to the length that is based on the number of battery cells), and welding the obtained extruded sidewall structures 302 and 304 having the length that is based on the number of battery modules to the casted member 300 that was obtained based on whether the number of battery modules is even or odd.

The casted member 306 may also be welded to the obtained extruded sidewall structures 302 and 304 having the length that is based on the number of battery modules. A base plate 308 and/or a lid having a size and/or a shape that is based on the number of battery modules may also be attached to the respective bottom and top of the structure formed from the casted member 300 that was obtained based on whether the number of battery modules is even or odd, the obtained extruded sidewall structures 302 and 304 having the length that is based on the number of battery modules, and the casted member 306.

Figure 7:
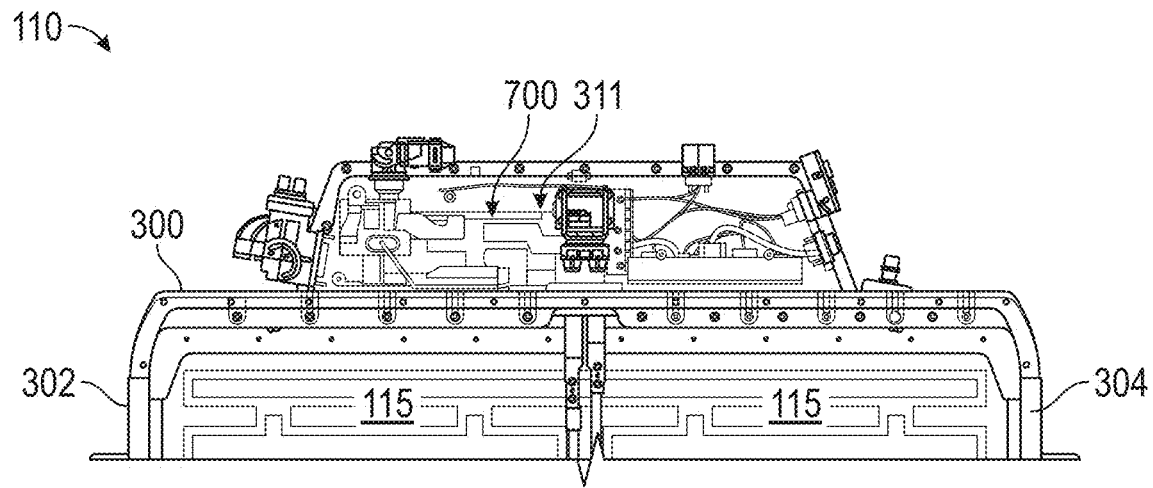
FIG. 7 illustrates a top view of a portion of battery pack with an even number of battery modules in accordance with one or more implementations.

FIG. 7 illustrates a portion of a battery pack 110 in the configuration of FIG. 5 in which the battery pack includes an even number of battery modules 115. In the example of FIG. 7, portions of two battery modules 115 are visible, having been installed in two of the portions 500 of the cavity 312. In the example of FIG. 7, a high voltage distribution box 700 is visible in the cavity 311. The high voltage distribution box 700 may be electrically coupled to the battery modules 115, such as via a connector and/or a cable that routes a conductive connection from the cavity 311 into the cavity 312 in which the battery modules 115 are installed. In the example of FIG. 7, the high voltage distribution box 700 is disposed within the cavity 311 defined by the casted member 300, and the casted member 300 is provided without space for a battery module 115. For example, the high voltage distribution box 700 may include electrical components for control of charging of the battery cells 120 in the battery modules 115, discharging of the battery cells 120 in the battery modules 115, short-circuit protection, current and/or voltage measurements, temperature monitoring, and/or other voltage distribution, control, and/or monitoring circuitry for the battery pack 110.

Figure 8:
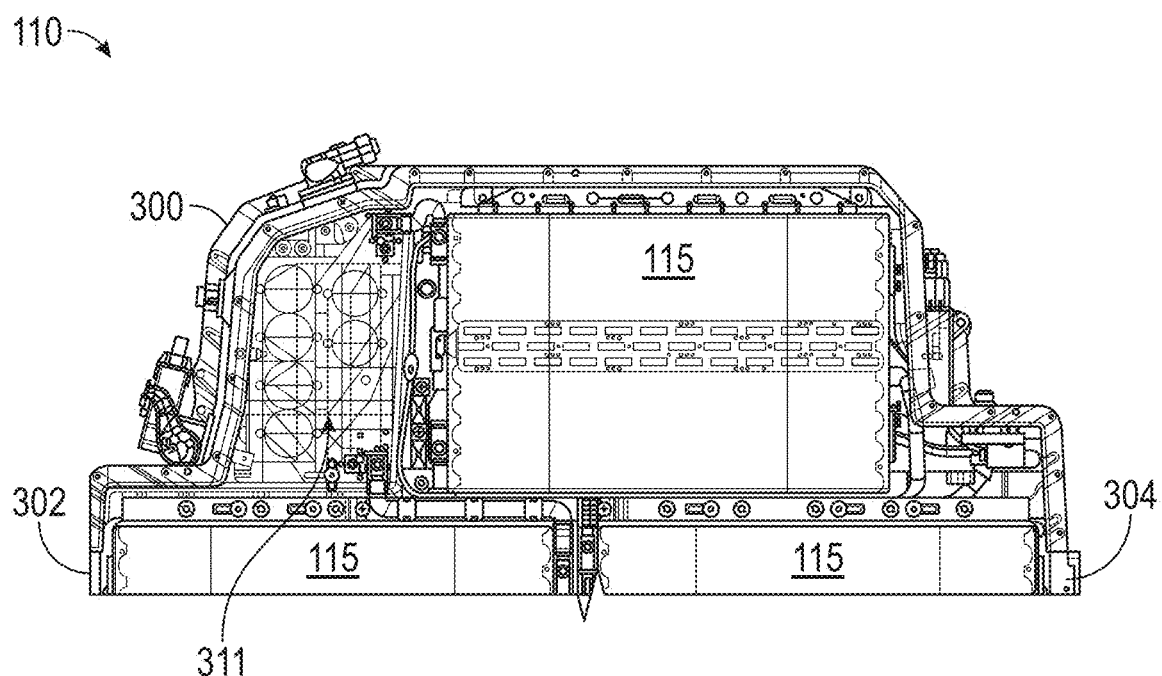
FIG. 8 illustrates a top view of a portion of battery pack with an odd number of battery modules in accordance with one or more implementations.

FIG. 8 illustrates a portion of a battery pack 110 in the configuration of FIG. 6 in which the battery pack includes an odd number of battery modules 115. In the example of FIG. 8, at least portions of three battery modules 115 are visible, two of which have been installed in two respective portions 500 of the cavity 312, and one of which is installed within the cavity 600 in the casted member 300. In the example of FIG. 8, a high voltage distribution box 700 disposed in the cavity 311. The high voltage distribution box 700 may be electrically coupled to the battery modules 115, such as via a connector and/or a cable that routes one or more conductive connections from the cavity 311 into the cavity 600 and/or the cavity 312 in which the battery modules 115 are installed. In the example of FIG. 8, the high voltage distribution box 700 is disposed within the cavity 311 defined by the casted member 300, and the casted member 300 includes space (e.g., cavity 600) for a battery module 115. As described herein, the casted member 300 in the implementation of FIG. 7 or the casted member 300 in the implementation of FIG. 8 may be selected for the battery pack 110 based on whether the number of battery modules 115 is even or odd, respectively.

Figure 9:
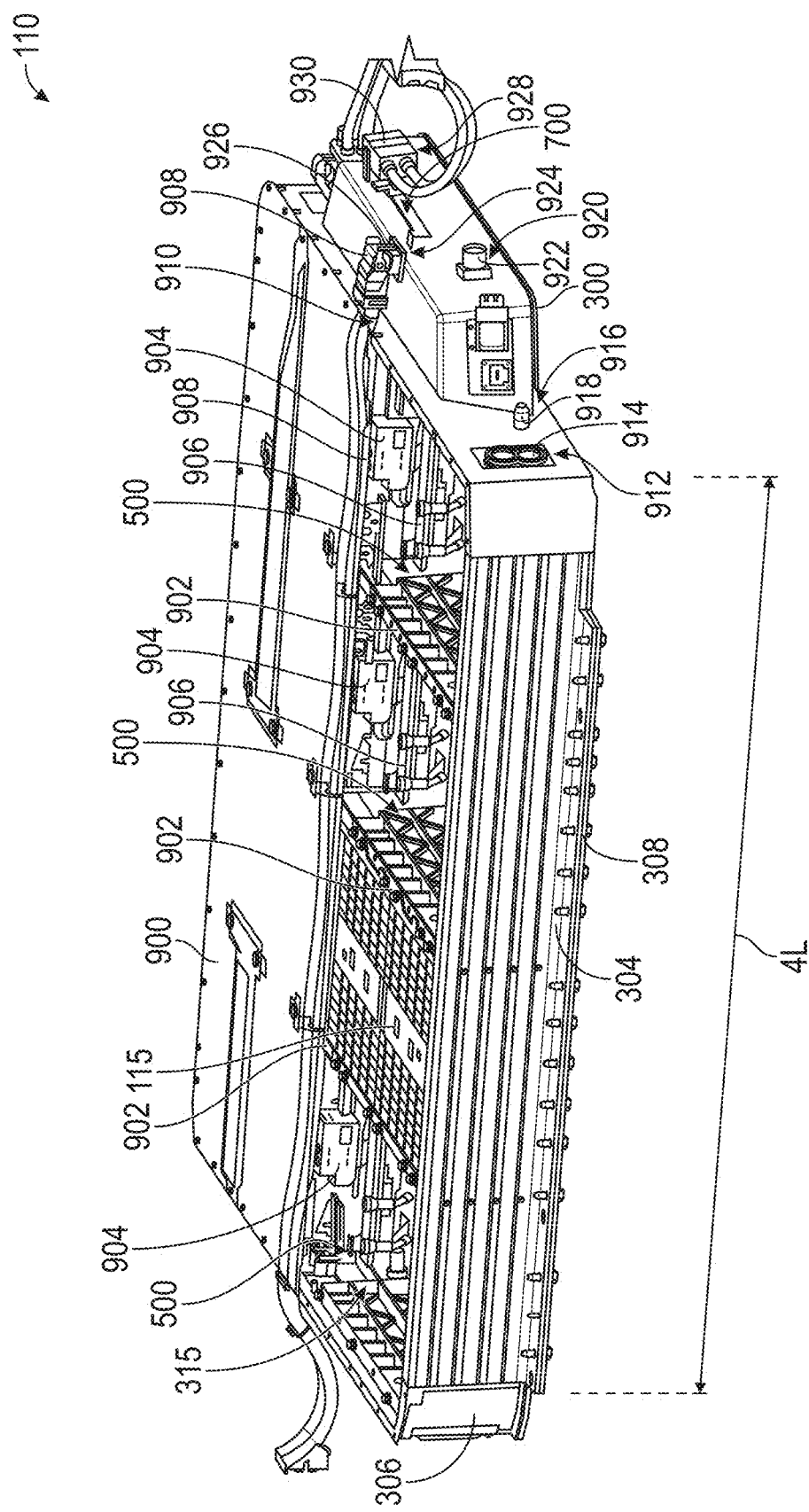
FIG. 9 illustrates a perspective view of a battery pack with an enclosure configured for eight battery modules in accordance with one or more implementations.
Figure 10:
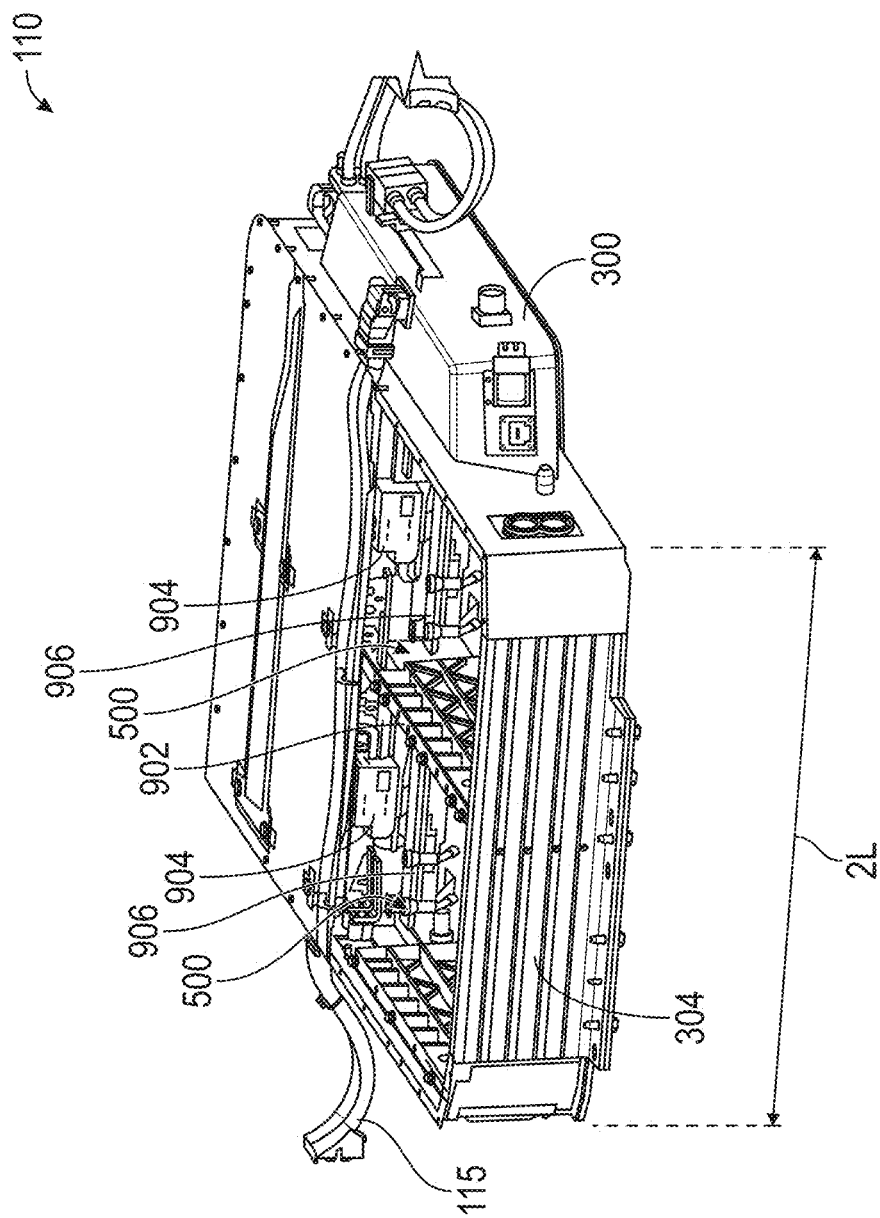
FIG. 10 illustrates a perspective view of a battery pack with an enclosure configured for four battery modules in accordance with one or more implementations.

FIGS. 9 and 10 illustrate examples of how the casted member 300 in the implementation of FIG. 7 may be used as part of an enclosure 205 for various different even numbers of battery modules 115. For example, in FIG. 9, the extruded sidewall structure 302 and the extruded sidewall structure 304 that are welded to the casted member 300 have a length, 4L, configured for enclosing four rows of battery modules 115 (e.g., four rows of two battery modules, for a battery pack 110 having eight battery modules). In the example of FIG. 9, a portion (e.g., half) of a lid 900 for the battery pack 110 is shown mounted to the casted member 300, the extruded sidewall structure 302, and the casted member 306. In the example of FIG. 9, two of the portions 500 of the cavity 312 have battery modules 115 installed therein. The other portions 500 of the cavity 312 are empty in FIG. 9 to allow other components and/or structures of the battery pack 110 to be seen.

For example, FIG. 9 illustrates how the battery pack 110 may have repeating mechanical, electrical, and/or thermal components, that repeat a number of times that corresponds to (e.g., equals half of) the number of battery modules 115 to be installed in the battery pack 110. For example, the battery pack may include one or more cross members 902. In the example of FIG. 9, the battery pack 110 includes three cross members 902 that are each installed between a pair of battery modules 115. For examples, two battery modules 115 on opposing sides of a cross member 902 may be mounted to the cross member 902 and configured to distribute an impact force into the cross member 902 and away from the battery cells 120 therewithin. The battery pack 110 may include, in one or more implementations, one fewer cross member than the number of rows of battery modules 115 in the battery pack. In one or more implementations, the casted member 300 may include features that form or couple to a front cross member for the two frontmost battery modules 115, and/or the casted member 306 may include features that form or couple to a rear cross member for the two rearmost battery modules 115.

FIG. 9 also illustrates how the battery pack 110 may include repeating electrical components 904 (e.g., high voltage bussing) that repeat within the enclosure for each battery module 115 or for each row of battery modules 115. The electrical components 904 may be substantially identical in each row of battery modules. FIG. 9 also illustrates how the battery pack 110 may include thermal components 906 (e.g., a coolant manifold) that repeats and/or scales with the length of the battery pack 110 (e.g., to provide coolant from the front or rear of the pack to all battery modules within the pack). The battery pack 110 may also include other circuitry and/or components (e.g., a serial peripheral interface (SPI) harness) that repeat and/or scale with the variable length of the battery pack 110. In one or more implementations, the battery pack 110 may include other structural features that repeat and/or scale with the length of the battery pack, such as mid wall that extends between columns of the battery pack and repeats and/or scales with the length of the battery pack.

FIG. 9 also illustrates other features that may be included in the battery pack 110. For example, the casted member 300 may be formed with various openings for various components of the battery pack 110. For example, the casted member 300 may include one or more openings 912 for one or more vents 914 (e.g., pressure relief valves) for the battery pack 110. The casted member 300 may include one or more openings 916 for one or more fittings 918 (e.g., for a coolant port for the battery pack 110). The casted member 300 may include one or more openings 920 for one or more connectors 922 (e.g., high voltage connectors or headers, such as the electrical contact 203 of FIG. 2A, which may be a drive unit connector for connecting the battery pack to a drive unit of the vehicle 100) for the battery pack 110. The casted member 300 may include one or more openings 924 for one or more connectors 926 for the battery pack 110. For example, the connector 926 may be configured to connect to a cable 908 that connects the high voltage distribution box 700 with the battery modules 115. For example, the cable 908 may extend through a notch 910 in a top surface of the casted member 300 and pass from the cavity 312 to the outer surface of the casted member 300 to connect to the connector 926 (in one or more implementations). The casted member 300 may include one or more openings 928 for one or more other connectors 930 for the battery pack 110. These features of the casted member 300 and the components mounted thereto may be the same, irrespective of the length of the enclosure 205 and/or the number of battery modules 115 therein.

In the example of FIG. 9, the battery pack 110 (e.g., with extruded sidewall structures 302 and 304 having the length 4L, and with three cross members 902, four repeats of the electrical components 904, and four repeats/extensions of the thermal components 906) is configured to include eight battery modules 115. In contrast, the battery pack 110 of FIG. 10 is configured to include four battery modules 115. As shown in FIG. 10, the battery pack 110 of FIG. 10 is identical to the battery pack 110 of FIG. 9, except that the extruded sidewall structures 302 and 304 having a length 2L, and the battery pack 110 includes only one mid-pack cross member 902, and two repeats/extensions of the electrical components 904 and the thermal components 906. The casted member 300 and the casted member 306 may be configured to be attached to extruded sidewall structures 302 and 304 having a length 4L, as in FIG. 9, a length 2L, as in FIG. 10, a length 1L, a length 3L, or a length that is any other integer multiple of L. Providing a battery pack with more or fewer battery modules, and scaling the size of the enclosure 205 accordingly, can help to provide increased or decreased power and/or range for electric vehicles, without including excess weight for unused or empty portions of a single-sized battery pack enclosure. This can help to increase the range of electric vehicles with fewer battery modules (e.g., in contrast with vehicles with the same number of battery modules in a larger enclosure with empty space).

In the examples of FIGS. 9 and 10, the enclosure 205 for the battery pack 110 is configured to enclose different even numbers of battery modules 115. However, it is appreciated that the casted member 300 of FIGS. 7, 9, and 10 can be replaced with the casted member 300 of FIG. 8, and any or all of the features of FIGS. 9 and 10 can be applied to provide enclosures 205 for the battery pack 110 that are configured to enclose various different odd numbers of battery modules 115. For example, FIGS. 11 and 12 illustrate implementations of the enclosure 205 that are configured to enclose nine battery modules and seven battery modules, respectively.

Figure 11:
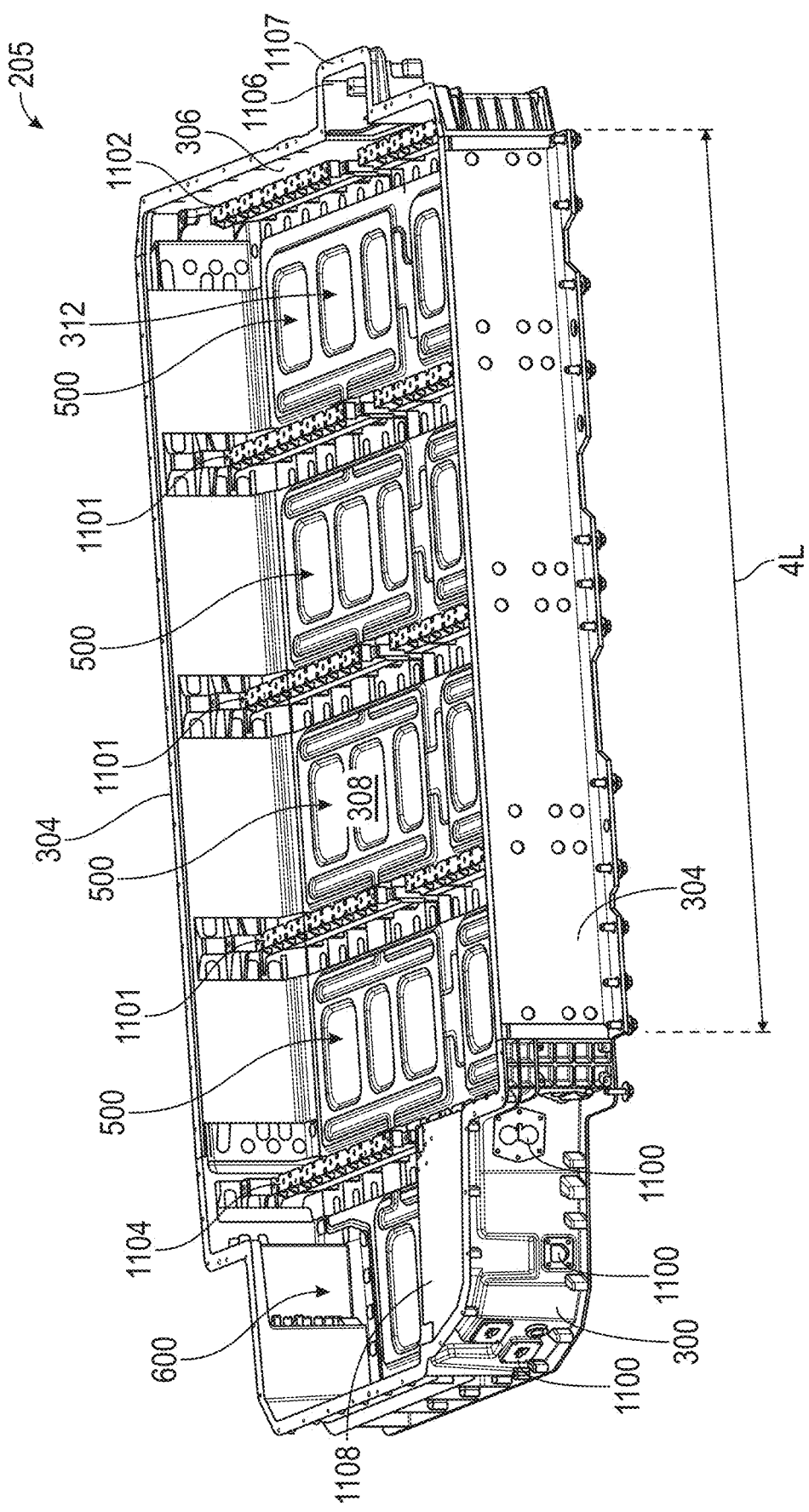
FIG. 11 illustrates a perspective view of a battery pack with an enclosure configured for nine battery modules in accordance with one or more implementations.

In the example of FIG. 11, the casted member 300 in the implementation of FIG. 8 is welded to extruded sidewall structures 302 and 304 each having a length 4L (e.g., as in the example of FIG. 9). In this example, the battery pack 110 includes three mounting structures 1101 (e.g., each between a two rows of battery modules). Each of the mounting structures 1101 may be used to mount a pair of adjacent battery modules 115 and a cross member 902, as in the example of FIG. 9. FIG. 11 shows how the casted member 300 in the implementation of FIG. 11 may also include various openings 1100 (e.g., for vents, electrical connectors, fittings for coolant ports, or the like). FIG. 11 also shows how the casted member 306 may form (or receive) a mounting structure 1102 for the two rearmost battery modules 115 and/or for a cross-member mounted thereto. FIG. 11 also shows how the casted member 300 may form (or receive) a mounting structure 1104 for the two front most battery modules 115 in the cavity 312, and for the battery module 115 mounted in the cavity 600 formed by the casted member 300 (and/or for a cross member mounted thereto). FIG. 11 also shows how the casted member 300 may include an integral top wall 1108 that covers the cavity 311 (e.g., and helps to separate the cavity 311 from the cavity 600 and the cavity 312).

Figure 12:
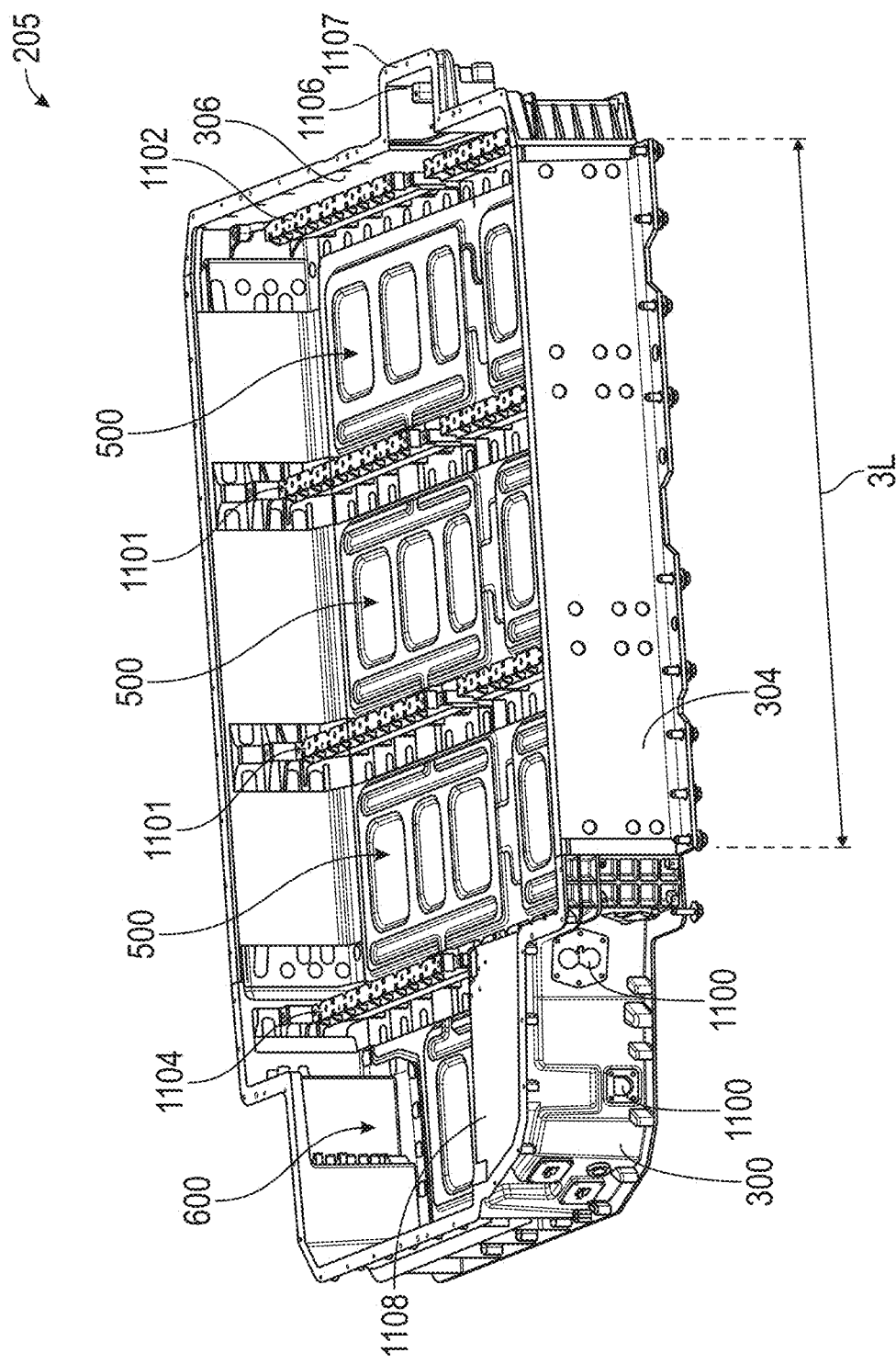
FIG. 12 illustrates a perspective view of a battery pack with an enclosure configured for seven battery modules in accordance with one or more implementations.

In the example of FIG. 12, the casted member 300 in the implementation of FIG. 8 is welded to extruded sidewall structures 302 and 304 each having a length 3L (e.g., as in the example of FIG. 10), and the battery pack 110 includes two mounting structures 1102 (e.g., each between a two rows of battery modules). The casted member 300 and the casted member 306 in the examples of FIGS. 11 and 12 may be configured to be attached to extruded sidewall structures 302 and 304 having a length 4L, as in FIG. 11, a length 3L, as in FIG. 12, a length 2L, a length 1L, or a length that is any other integer multiple of L. In this way, the battery pack may be configurable for various different odd numbers of battery modules 115.

As illustrated by the examples of FIGS. 3-12, in one or more implementations, an apparatus (e.g., a vehicle 100, a building 180, a battery pack 110 such as a configurable battery pack) may include the casted member 300 having a cavity 311 configured to enclose a high voltage distribution box 700, a first end 400 configured to be welded to any of a plurality of first extruded sidewalls (e.g., extruded sidewall structures 302) having any of various respective lengths (e.g., L, 2L, 3L, 4L, 5L, or the like), and a second end 402 configured to be welded to any of a plurality of second extruded sidewalls (e.g., extruded sidewall structures 304) having any of the respective lengths.

The casted member 300 may also include an additional cavity 600 configured to receive a battery module 115 for the configurable battery pack. The casted member 300 may include one or more openings (e.g., openings 912, 916, 920, 924, 928, and/or 1100) configured to provide access to one or more electrical components of the configurable battery pack from outside the enclosure. The casted member may include at least one notch 910 configured to receive a cable 908 coupled to one or more battery modules 115 of the configurable battery pack. The casted member 300 may be configured to attach to a base plate 308 and a lid 900 of the enclosure. The casted member 300 may include or form a casted front portion of the enclosure for the configurable battery pack.

As illustrated by the examples of FIGS. 3-12, in one or more implementations, a configurable battery pack (e.g., battery pack 110) may include a casted member 300 for an enclosure 205 for the configurable battery pack. The casted member 300 may have a cavity 311 configured to enclose a high voltage distribution box 700, a first end 400 configured to be welded to any of various first extruded sidewalls (e.g., extruded sidewall structures 302) having any of various respective lengths (e.g., L, 2L, 3L, 4L, 5L, or the like), and a second end configured to be welded to any of various second extruded sidewalls (e.g., extruded sidewall structures 304) having the various respective lengths. The configurable battery pack may also include one of the various first extruded sidewalls having one of the respective lengths and welded to the first end 400 of the casted member 300, the one of the respective lengths being based on number of battery modules 115 of the configurable battery pack.

The configurable battery pack may also include one of the various second extruded sidewalls having the one of the respective lengths and welded to the second end 402 of the casted member. The casted member 300 may form a casted front member, and the configurable battery pack may also include a casted rear member (e.g., casted member 306) welded to the one of the various first extruded sidewalls and the one of the various second extruded sidewalls. For example, the casted rear member may include an extension 1107 having an opening 1106 configured to receive one or more electrical components (e.g., a pyrofuse, a mid-pack disconnect, a probe point, or the like) of the configurable battery pack.

In one or more implementations, the configurable battery pack may be configured to enclose an odd number of battery modules 115 (e.g., as in the examples of FIGS. 6, 8, 11, and 12), and the casted member may include an additional cavity 600 configured to receive one of the odd number of battery modules 115. The one of the respective lengths may be based on the odd number of battery modules 115.

In one or more implementations, the configurable battery pack may be configured to enclose an even number of battery modules (e.g., as in the examples of FIGS. 5, 7, 9, and 10), and the casted member 300 may have a size that is smaller than a size of each of the even number of battery modules 115. The one of the respective lengths may be based on the even number of battery modules. The configurable battery pack may also include the high voltage distribution box disposed in the cavity.

As shown in the examples of FIGS. 7-12, the casted member 300 may be a single, unitary structure that may be free of external pouches and/or pockets (e.g., for housing additional electrical components of the battery pack) that are welded to the external surface of the casted member, in one or more implementations. FIGS. 11 and 12 also illustrate how the casted member 300 may be provided with structural features, such as ribs or other reinforcing features. The structural features may provide additional strength for the enclosure 205 and the battery pack 110, providing robustness to external forces (e.g., linear forces, twisting or bending forces, and/or impact forces).

FIG. 13 illustrates a flow diagram of an example process 1300 that may be performed for assembling a battery pack or an enclosure therefor, in accordance with implementations of the subject technology. For explanatory purposes, the process 1300 is primarily described herein with reference to the battery pack 110 of FIGS. 1A-2A. However, the process 1300 is not limited to the 1300 of FIG. 1A-2A, and one or more blocks (or operations) of the process 1300 may be performed by one or more other structural components of other suitable moveable apparatuses, devices, or systems. Further for explanatory purposes, some of the blocks of the process 1300 are described herein as occurring in serial, or linearly. However, multiple blocks of the process 1300 may occur in parallel. In addition, the blocks of the process 1300 need not be performed in the order shown and/or one or more blocks of the process 1300 need not be performed and/or can be replaced by other operations.

As illustrated in FIG. 13, at block 1302, a number of battery modules (e.g., battery modules 115) to be included in a battery pack (e.g., battery pack 110) may be identified. As examples, the number of the battery modules may be two battery modules, three battery modules, four battery modules, five battery modules, six battery modules, seven battery modules, eight battery modules, nine battery modules, or more than nine battery modules.

At block 1304, a determination may be made whether the number of battery modules is odd or even. For example, the number of the battery modules may be an odd number of the battery modules or an even number of the battery modules.

At block 1306, a casted member (e.g., casted member 300) for an enclosure (e.g., enclosure 205) for the battery pack may be obtained based on the determining of whether the number of battery modules is odd or even. For example, obtaining the casted member based on the determining of whether the number of battery modules is odd or even may include selecting, from a plurality of previously formed casted members, one of a first set of the previously formed casted members (e.g., having space for a battery module) if the number of the battery modules is odd or one of a second set of the previously formed casted members (e.g., without space for a battery module) if the number of the battery modules is even.

At block 1308, the enclosure of the battery pack including the casted member may be assembled. In one or more implementations, the process 1300 may also include obtaining a first extruded sidewall (e.g., extruded sidewall structure 302) and a second extruded sidewall (e.g., extruded sidewall structure 302) for the battery modules based on the number of battery modules, and assembling the enclosure may include welding the first extruded sidewall to a first end (e.g., first end 400) of the casted member and welding the second extruded sidewall to a second end (e.g., second end 402) of the casted member. Obtaining the first extruded sidewall may include selecting the first extruded sidewall from multiple first extruded sidewalls having different lengths (e.g., L, 2L, 3L, 4L, etc.), based on the number of battery modules to be included in the battery pack. Obtaining the second extruded sidewall may include selecting the second extruded sidewall from multiple second extruded sidewalls having different lengths (e.g., L, 2L, 3L, 4L, etc.), based on the number of battery modules to be included in the battery pack.

In one or more implementations, assembling the enclosure may also include welding an additional casted member (e.g., casted member 306) to the first extruded sidewall and the second extruded sidewall. In one or more implementations, assembling the enclosure may also attaching a base plate (e.g., base plate 308) to the casted member, the additional casted member, the first extruded sidewall, and the second extruded sidewall.

In one or more implementations, the process 1300 may also include providing the battery modules in the enclosure; providing a high voltage distribution box (e.g., HVDB 700) to into a cavity (e.g., cavity 311) in the casted member; and closing the enclosure by attaching a lid (e.g., lid 900) to the casted member, the additional casted member, the first extruded sidewall, and the second extruded sidewall.

In one or more implementations, the process 1300 may also include installing the battery pack in a vehicle (e.g., vehicle 100) or a building (e.g., building 180). In one or more implementations, identifying the number of battery modules to be included in the battery pack may include identifying the number of the battery cells based on a type of the vehicle. As examples, the type of the vehicle may include a category of vehicle (e.g., a sedan, a sports car, a sport utility vehicle (SUV), a truck, etc.), a ranking within a category (e.g., a luxury, standard, high performance, or economy version of a vehicle within a category), or a range-classification for the vehicle (e.g., a long range vehicle, a mid-range vehicle, or a low-range vehicle within a category), as examples.

Aspects of the subject technology can help improve the manufacturability and/or proliferation of electric vehicles, which can positively impact the climate by reducing greenhouse gas emissions.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the invention. The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

In one aspect, a term coupled or the like may refer to being directly coupled. In another aspect, a term coupled or the like may refer to being indirectly coupled.

Terms such as top, bottom, front, rear, side, horizontal, vertical, and the like refer to an arbitrary frame of reference, rather than to the ordinary gravitational frame of reference. Thus, such a term may extend upwardly, downwardly, diagonally, or horizontally in a gravitational frame of reference.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112 (f), unless the element is expressly recited using the phrase "means for" or, in the case of a method claim, the element is recited using the phrase "step for".

Those of skill in the art would appreciate that the various illustrative blocks, modules, elements, components, methods, and algorithms described herein may be implemented as hardware, electronic hardware, computer software, or combinations thereof. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language of the claims and to encompass all legal equivalents. Notwithstanding, none of the claims are intended to embrace subject matter that fails to satisfy the requirements of the applicable patent law, nor should they be interpreted in such a way.

What is claimed is:

1. An apparatus, comprising:
a unitary casted member for an enclosure for a configurable battery pack, the unitary casted member configured to form a front wall of the enclosure,
the unitary casted member comprising:
a cavity configured to enclose a high voltage distribution box,
a first end portion that bends away from the front wall to form a portion of a first sidewall of the enclosure, the first end portion connectable to any of a plurality of first extruded linear sidewall structures having a plurality of respective lengths, and
a second end portion that bends away from the front wall to form a portion of a second sidewall of the enclosure, the second end portion connectable to any of a plurality of second extruded linear sidewall structures having the plurality of respective lengths.

2. The apparatus of claim 1, wherein the unitary casted member further comprises an additional cavity configured to receive a battery module for the configurable battery pack.

3. The apparatus of claim 1, wherein the unitary casted member has a shape that is based on a number of battery modules of the configurable battery pack.

4. The apparatus of claim 1, wherein the unitary casted member comprises one or more openings configured to provide access to one or more electrical components of the configurable battery pack from outside the enclosure.

5. The apparatus of claim 1, the unitary casted member further comprising at least one notch configured to receive a cable coupled to one or more battery modules of the configurable battery pack.

6. The apparatus of claim 1, wherein the unitary casted member is configured to attach to a base plate and a lid of the enclosure.

7. The apparatus of claim 1, wherein the unitary casted member comprises a monolithic, unitary casted member.

8. A configurable battery pack, comprising:
 a unitary casted member for an enclosure for the configurable battery pack, the unitary casted member configured to form a front wall of the enclosure, the unitary casted member comprising:
 a cavity configured to enclose a high voltage distribution box;
 a first end portion that bends away from the front wall to form a portion of a first sidewall of the enclosure, the first end portion connectable to any of a plurality of first extruded linear sidewall structures having a plurality of respective lengths; and
 a second end portion that bends away from the front wall to form a portion of a second sidewall of the enclosure, the second end portion connectable to any of a plurality of second extruded linear sidewall structures having the plurality of respective lengths.

9. The configurable battery pack of claim 8, further comprising one of the plurality of first extruded linear sidewall structures having one of the respective lengths and welded to the first end portion of the unitary casted member, the one of the respective lengths being based on number of battery cells of the configurable battery pack.

10. The configurable battery pack of claim 9, further comprising one of the plurality of second extruded linear sidewall structures having the one of the respective lengths and welded to the second end portion of the unitary casted member.

11. The configurable battery pack of claim 10, wherein the configurable battery pack further comprises a casted rear member welded to the one of the plurality of first extruded linear sidewall structures and the one of the plurality of second extruded linear sidewall structures.

12. The configurable battery pack of claim 11, wherein the casted rear member comprises an extension having an opening configured to receive one or more electrical components of the configurable battery pack.

13. The configurable battery pack of claim 10, wherein the configurable battery pack is configured to enclose an odd number of battery modules, and wherein the unitary casted member comprises an additional cavity configured to receive one of the odd number of battery modules.

14. The configurable battery pack of claim 13, wherein the one of the respective lengths is based on the odd number of battery modules.

15. The configurable battery pack of claim 10, wherein the configurable battery pack is configured to enclose an even number of battery modules, and wherein the unitary casted member has a size that is smaller than a size of each of the even number of battery modules.

16. The configurable battery pack of claim 15, wherein the one of the respective lengths is based on the even number of battery modules.

17. The configurable battery pack of claim 10, further comprising the high voltage distribution box disposed in the cavity.

* * * * *